FIG. IV

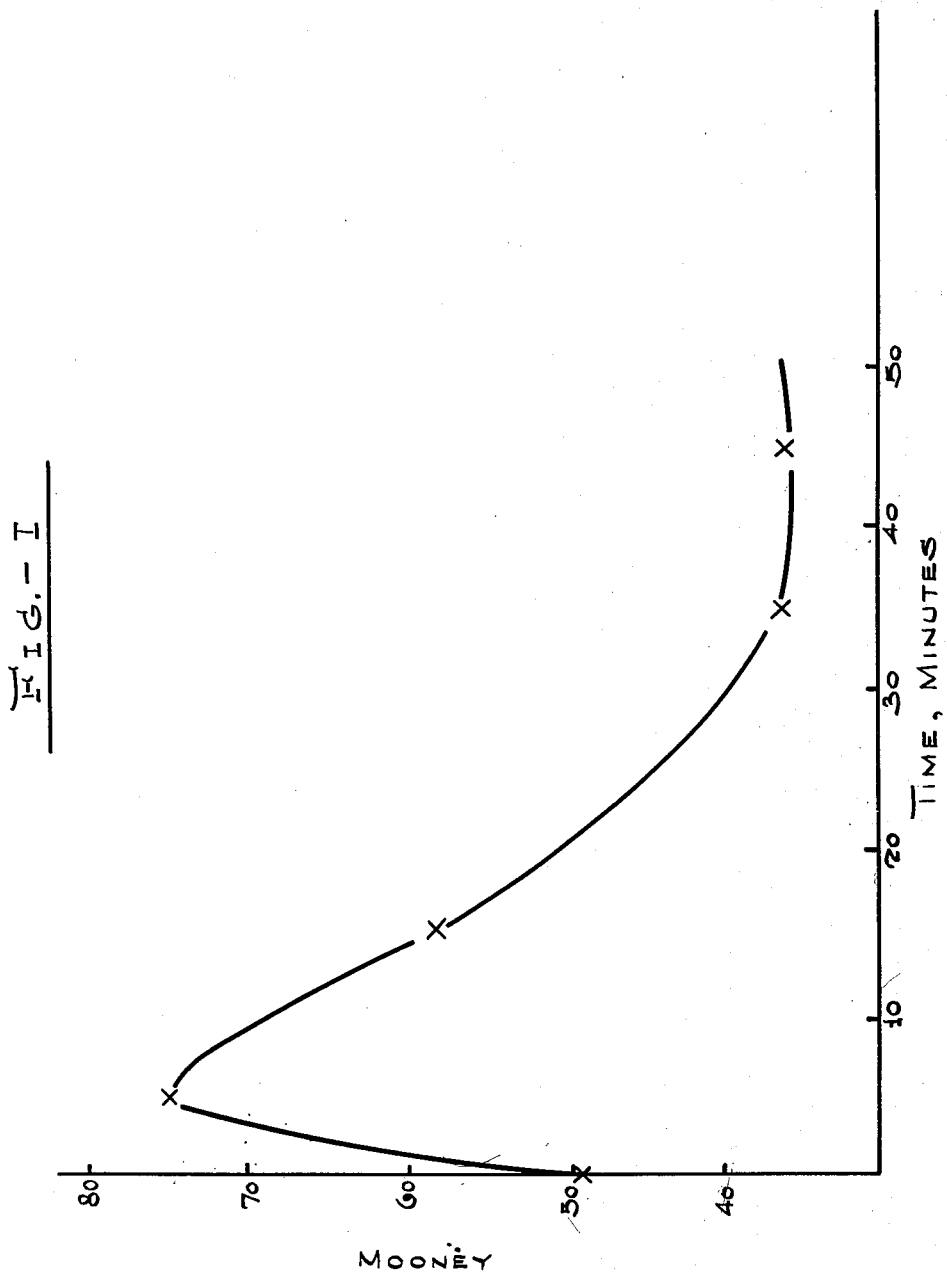

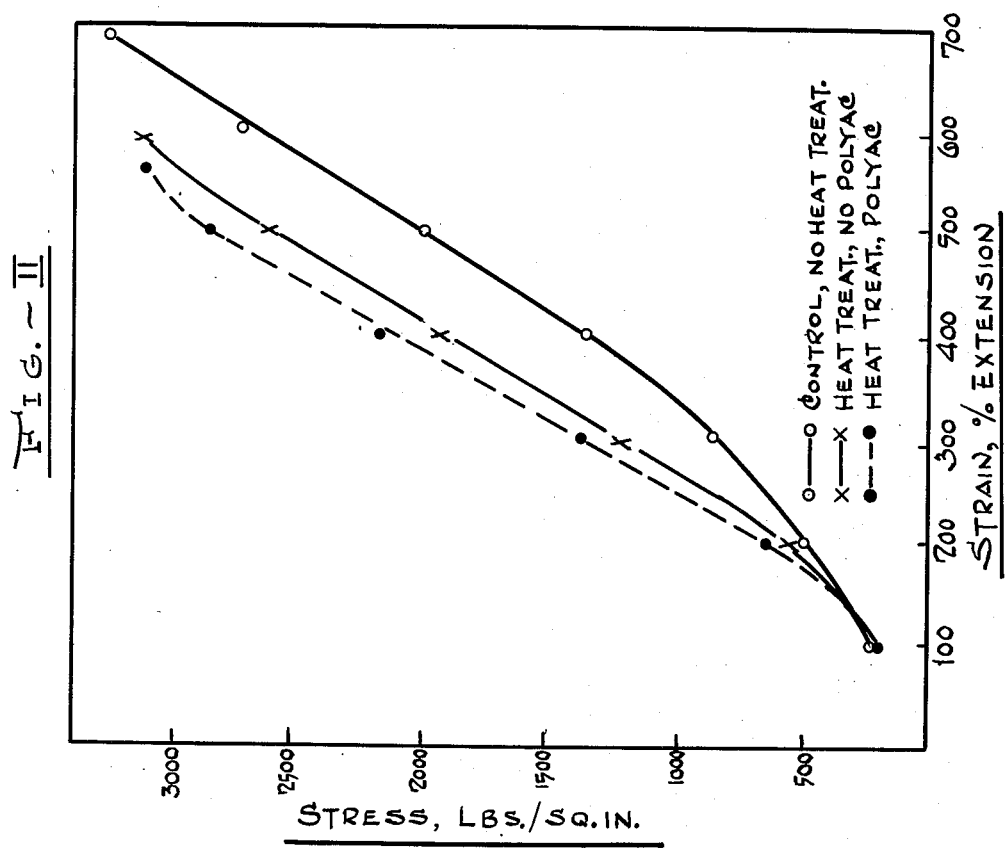

KEY.
① CONTROL, NO HEAT TREATMENT
② HEAT TREATED, NO POLYAC
③ HEAT TREATED, POLYAC

ELECTRICAL RESISTIVITY, OHM CENTIMETERS

FIG. III

DAMPING, $\eta f \times 10^{-6}$ (POISES × C.P.S.) @ 50°C.

Francis P. Ford
Albert M. Gessler   INVENTORS
BY E. Janet Berry   ATTORNEY

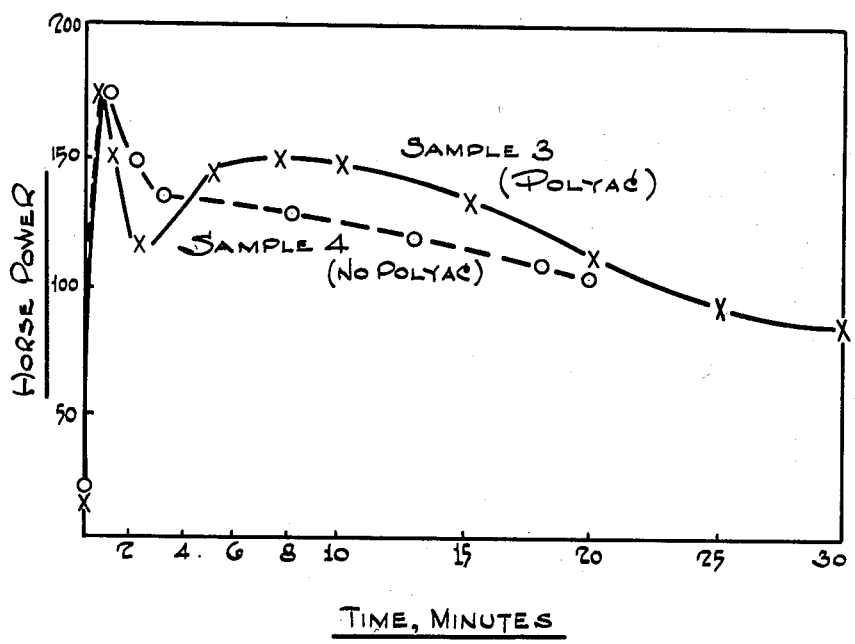

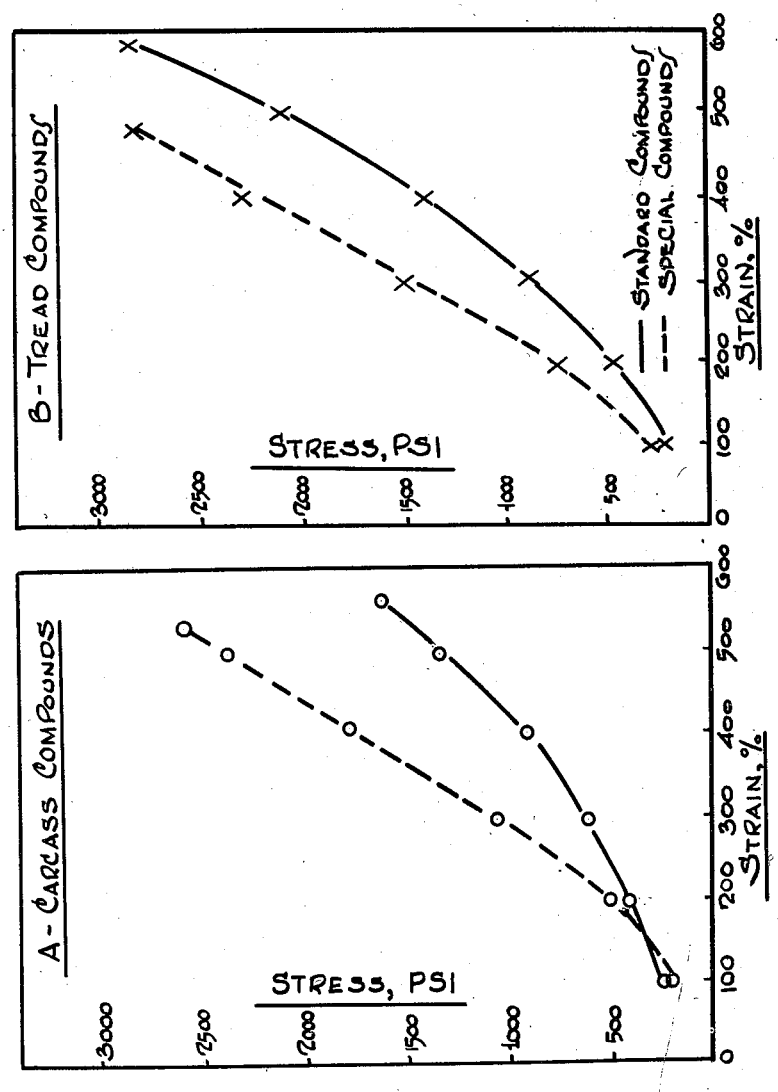

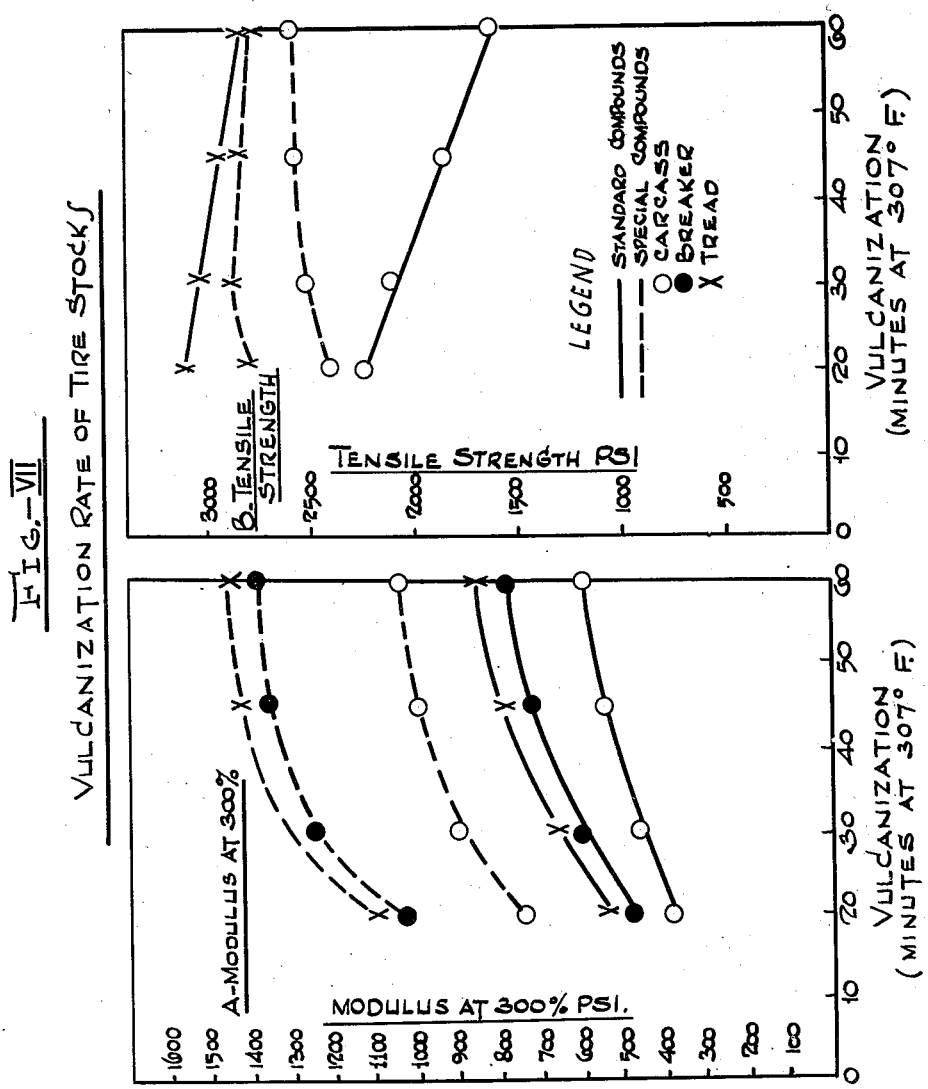

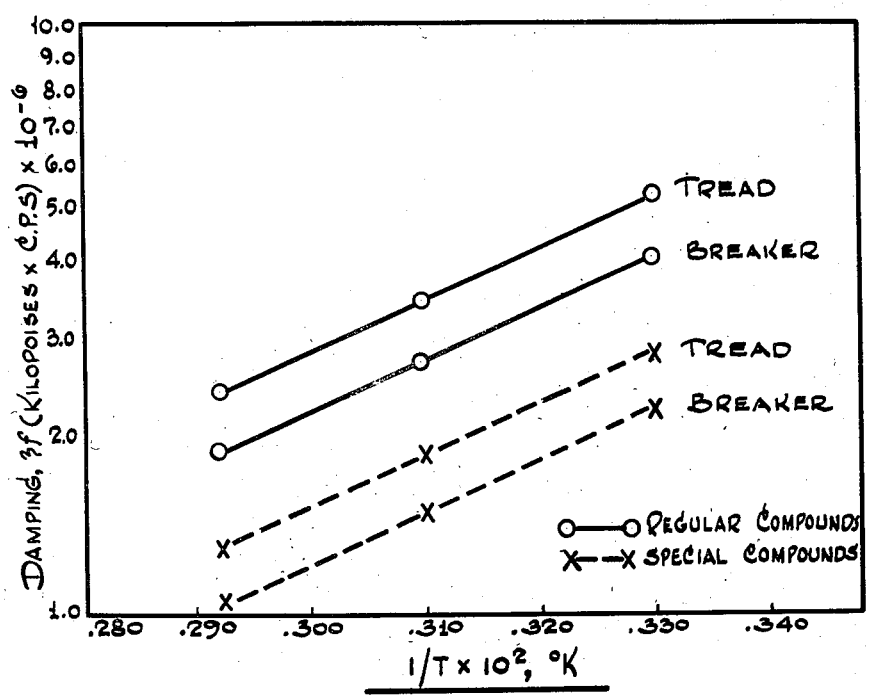

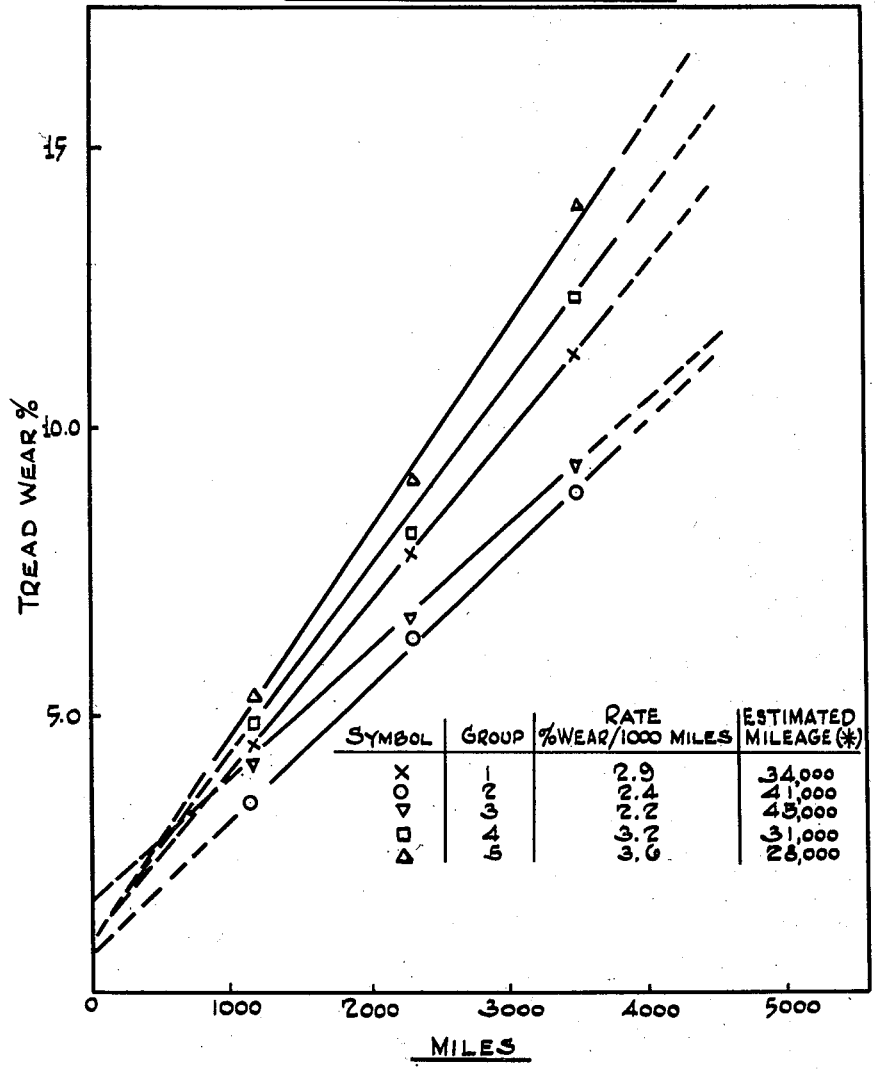

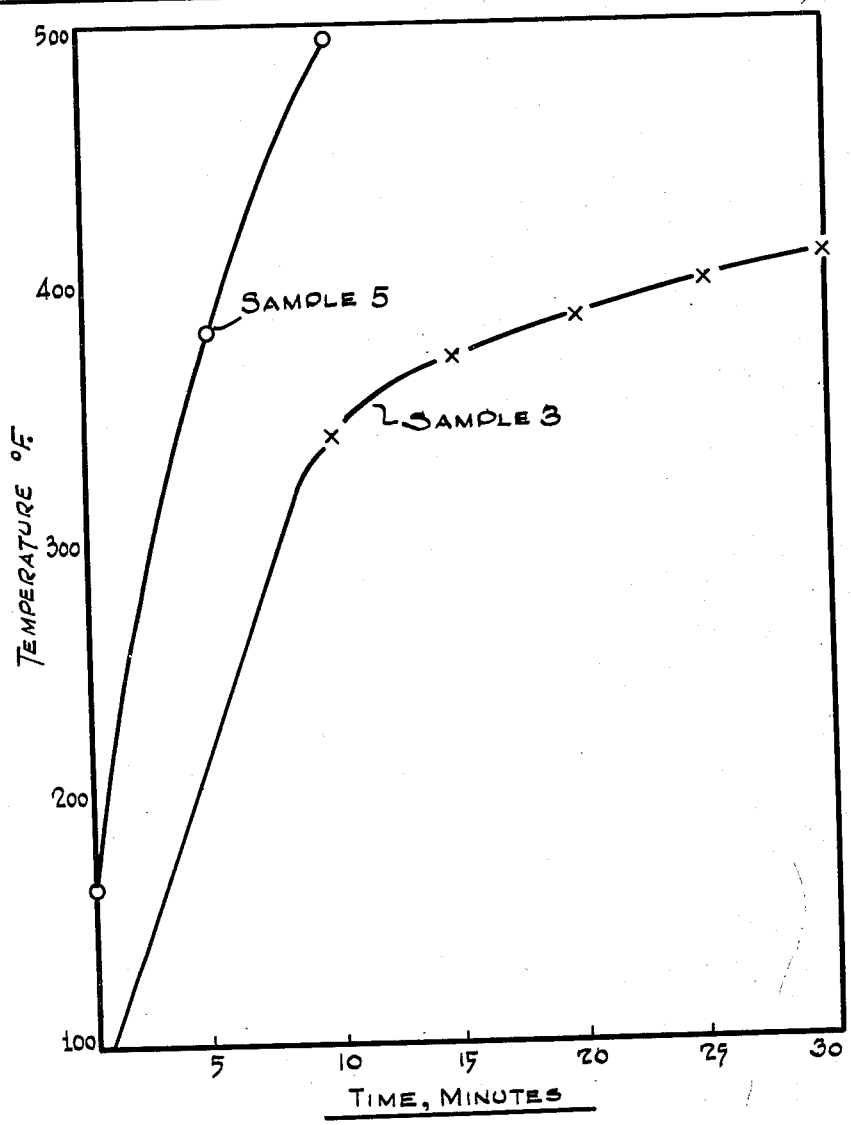

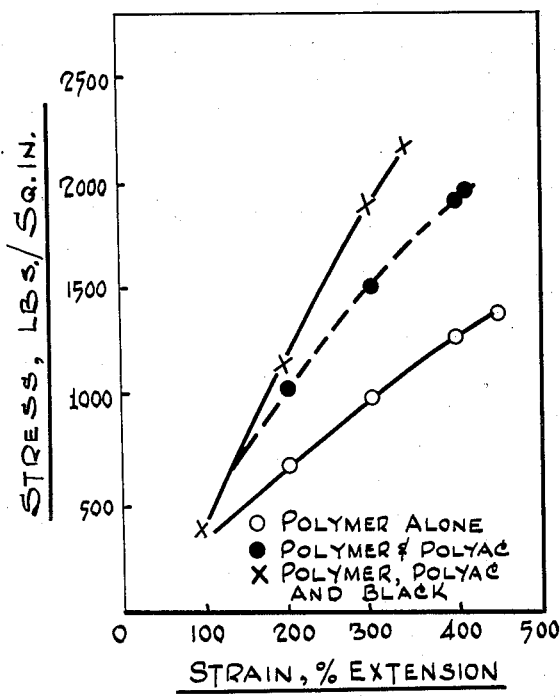

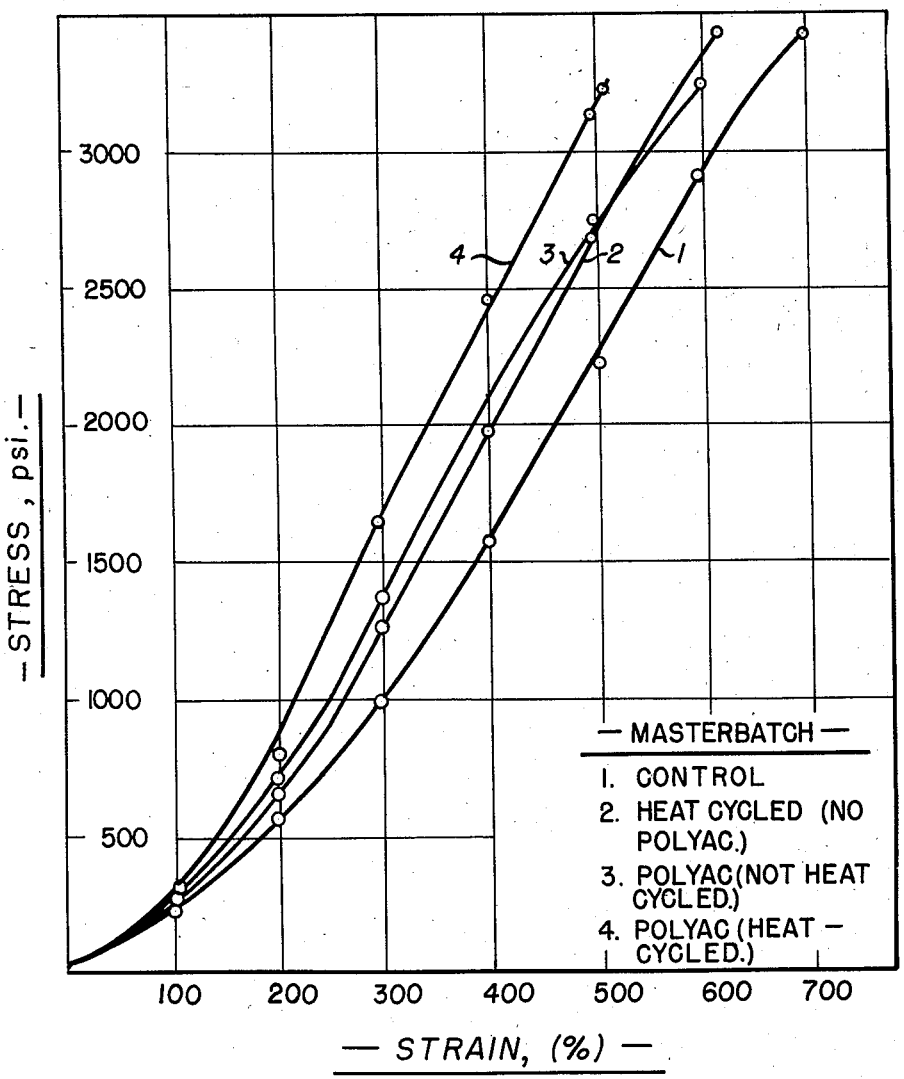

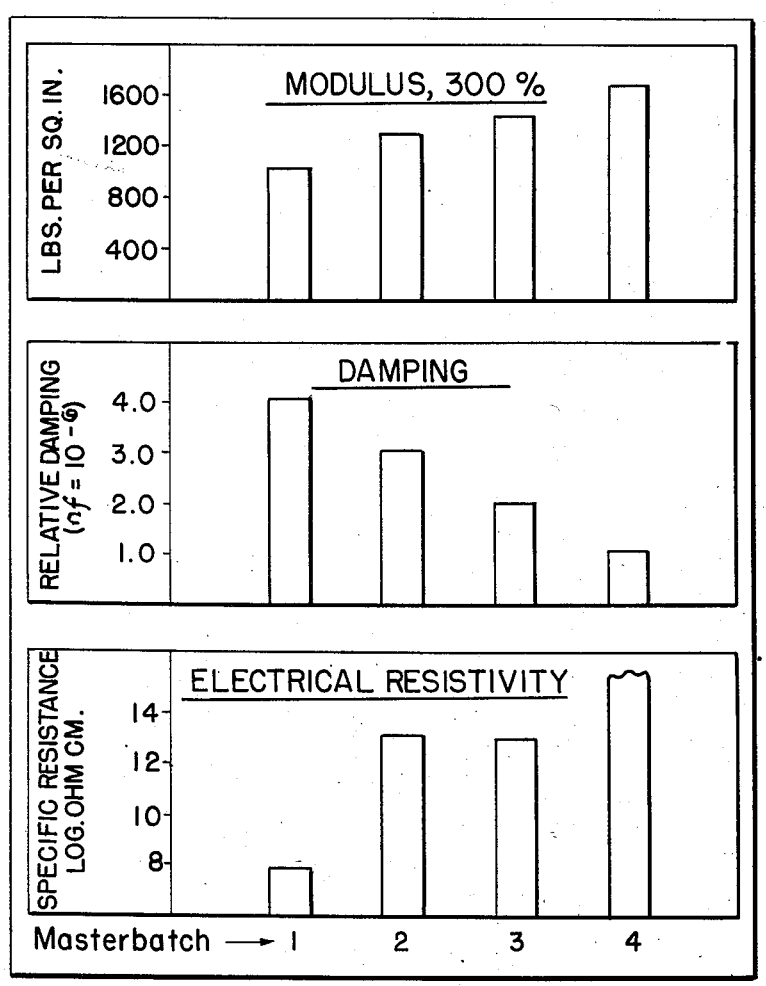

United States Patent Office 2,822,342
Patented Feb. 4, 1958

2,822,342

HEAT PROCESSING OF BUTYL RUBBER WITH CARBON BLACK AND A PROMOTER AND PRODUCT OBTAINED

Francis P. Ford, Roselle, and Albert M. Gessler, Cranford, N. J., assignors to Esso Research and Engineering Company, a corporation of Delaware Application June 2, 1952, Serial No. 291,164

20 Claims. (Cl. 260—41.5)

TABLE OF CONTENTS

| | Col. No. |
|---|---|
| Heat treatment with dinitroso benzene (Polyac) | 11 |
| Commercial experiments on Polyac-heat treated compositions | 12 |
| Effect of time and temperature on Polyac-heat treatment | 17 |
| Heat-mill cycle experiments | 18 |
| Effect of carbon black on thermal interaction with Polyac | 18 |
| Static heat treatment with Polyac using reinforcing black | 19 |
| Static heat treatment with Polyac using non-reinforcing black | 19 |
| Commercial experiments using thermal (non-reinforcing) carbon black and Polyac | 20 |
| Effect of other cross-linking agents | 21 |
| Banbury heat treatment with and without Polyac | 21 |
| Effect of heat treatment with Polyac on GR–S and natural rubber | 23 |
| Effect of variations in Polyac concentration | 24 |

This invention is concerned with novel techniques for processing and compounding synthetic, rubbery olefin-multiolefin polymers and, more particularly, with novel methods for preparing such new rubbery polymer compositions having outstanding properties and to such compositions themselves.

A method for preparing polymer-carbon black compositions by the use of limited and critical amounts of dinitroso, dioxime and similar related compounds, under certain specified conditions of thermal interaction, has been discovered. These novel compositions have greatly improved physical properties. The method generally is carried out by conducting a time and temperature controlled thermal treatment of a mixture of raw polymer gum and carbon black either with or without simultaneous or subsequent agitation in the presence of a limited amount, preferably about 0.3 up to 3% of aromatic dinitroso, dioxime and related compounds, and preferably about 0.5% of p-dinitroso benzene, commercially known as Polyac. This thermal treatment is not a vulcanization but is carried out prior to vulcanization. The addition of the curative materials employed herein are in insufficient amounts to effect the cure and thus this process represents a novel thermal pretreatment of the polymer-carbon black mixtures in the presence of limited amounts of the aromatic dinitroso, dioxime and related compounds prior to vulcanization.

It has also been previously known that such aromatic dinitroso compounds as p-dinitroso benzene (Polyac) can be employed in very small amounts of 0.01 to 0.15 part per 100 parts of isoolefin-multiolefin copolymer in order to afford an effective method for reducing the cold flow of unvulcanized isoolefin-multiolefin copolymers. For example, U. S. 2,526,504 teaches a method for increasing the bruise resistance of the low unsaturation isobutylene-diolefin synthetic copolymers by increasing to its maximum the Mooney value prior to curing by pretreatment with an aromatic dinitroso compound in amounts ranging from 0.1% to about 0.0008% prior to vulcanization. This treatment does not cure the material but is used only to increase its bruise resistance in the uncured form without changing its milling, extruding and calendering properties and is employed to avoid substantially all of the thinning and weakening of structures which would otherwise occur during fabrication of such articles as inner tubes. According to the treatment as described in U. S. 2,526,504 and in various publications, the mixture of uncured isoolefin-multiolefin copolymers together with about 0.1 up to a maximum of 0.15% of aromatic dinitroso compound is subjected to a hot milling or Banbury treatment at a temperature between 240° F. and 320° F., preferably at about 300° F., for a limited time period, 5 minutes being the suggested time for maximum improvement in Mooney value, whereby the copolymer is made stiffer and more elastic. The prior art treatment for reducing cold flow and bruise resistance is obviously for the purpose of causing the copolymer to reach the maximum in Mooney value and causes disadvantages in processing including a decided tendency to scorching.

It has now been discovered that greatly improved products can be obtained by a novel thermal interaction process in which carbon black and isoolefin-multiolefin copolymer mixtures are subjected to controlled heat treatment in the presence of from about 0.3 up to 3% of at least one material selected from the group consisting of dinitroso, dioximes, and related compounds. Preferably the aromatic dinitroso and dioxime compounds are employed. Data are present herein to show that this special thermal interaction when carried out under controlled conditions of time and temperature, in the presence of the specific materials, yields products which are particularly well adapted for commercial use. Furthermore, it will be shown that for this invention it is necessary to employ mixtures containing only limited and critical amounts of the dinitroso, dioxime or other material used, and that this process can be employed giving good results for treating mixtures containing any kind or type of carbon black including those of both the reinforcing and non-reinforcing types. It will also be shown by data that the process herein described for preparing the new compositions is an entirely different kind of interaction from any which has been previously described.

Data are also herein included which show that the process to which the mixtures are subjected gives an interaction of an entirely different nature from that commonly known as "vulcanization," even though the aromatic dinitroso compounds and aromatic dioximes and other compounds of similar type are well known as vulcanization agents for the low unsaturation isoolefin-multiolefin copolymers.

The curve of accompanying Figure I demonstrates the differences between the pretreatment of the prior art to reduce cold flow and prevent bruise resistance and the treatment resulting from the invention herein described. The ascending portion of the curve shown in Figure I which reaches a maximum Mooney value of between 75 and 80 in less than 10 minutes shows the results obtained by the prior art in which very small proportions of the order of 0.1 up to a maximum of 0.3% dinitroso benzene were admixed with isoolefin-multiolefin copolymers and heated for a comparatively short period of time, the time period being less than 10 minutes. This is the treatment of U. S. 2,526,504. A relatively large increase in Mooney value is obtained which results in a greatly decreased cold flow of the polymer gum during subsequent operations and storage. The remaining portion of the curve shows the results which are obtained upon the use of relatively large amounts of aromatic dinitroso compounds and the like when they are heated with the isoolefin-multiolefin copolymers in the presence of carbon black for relatively longer periods of time, greater than 10 minutes, and preferably with accompanying milling and mastication. This portion of the curve demonstrates the process and results obtained by the present invention. Under the conditions of the invention, the Mooney value is markedly decreased and products of greatly improved physical properties result.

Although it has been previously known that carbon black could be used in the compounding of isoolefin-multiolefin copolymers, as for instance in U. S. 2,363,703 employing unusually large amounts of carbon black, this invention teaches to the art a completely practical and satisfactory process for preparing isoolefin-multiolefin compositions with carbon black whereby the compositions are not merely satisfactory but are highly advantageous for use in tire casing formulations and for other purposes, particularly with respect to both stress-strain and resiliency properties.

The heat treatment or thermal interaction method in the presence of aromatic dinitroso, aromatic dioxime and like compounds, which is described herein, is employed to overcome the sluggishness and lack of resilience of these copolymer-carbon black vulcanizates and to increase their toughness and simultaneously reduce their internal viscosity. Although it is known that the addition of carbon black ordinarily increases the already high internal viscosity of the isoolefin-multiolefin vulcanizates, the copolymer-carbon black systems which have been subjected to the herein disclosed heat treatment in the presence of at least one of the specified materials, show a greatly reduced effect of the presence of the carbon black on the internal viscosity of the copolymer. This process for improving the internal viscosity properties also favorably affects the stress-strain properties of the isoolefin-multiolefin copolymer.

The novel process is not limited to the use of any particular type of carbon black and gives satisfactory results with mixtures containing both reinforcing and non-reinforcing carbon blacks. It is particularly surprising that non-reinforcing carbon blacks when used in conjunction with the invention acquire the ability to impart reinforcement to the isoolefin-multiolefin copolymers. Thus, it has been found that the heat treatment process when used under critical conditions of time and temperatures with p-dinotroso benzene and similar compounds is effective whether carbon blacks of the channel, furnace and/or thermal types are used.

It is to be understood that the unusual and surprising effect in improved stress-strain and internal viscosity properties which have been found to result from this novel thermal interaction method using materials selected from the aromatic dinitroso compounds, aromatic dioximes and compounds of similar type are substantially limited to the synthetic isoolefin-multiolefin copolymers. The uniform good results are, in fact, unique to these types of low unsaturation copolymers. When used for treating other polymers, it causes disadvantages in properties, such as a reduced tear strength, particularly with the more highly unsaturated rubbery materials.

Although some slight improvements in properties may be noted from the thermal treatment of natural rubber and other synthetic polymers in the presence of aromatic dinitroso compounds, these treatments produce undesirable changes in certain other properties of the rubber and copolymers and result in products having greatly decreased usefulness. In particular, it has been found and can be shown that the tear resistance of natural rubber and synthetic copolymers other than those of the low unsaturation isoolefin-multiolefin type is greatly reduced when a treatment similar to that of the invention is employed for these more highly unsaturated rubbery materials. It can be shown, for instance, that this greatly decreased tear resistance is so vital to the properties of the rubbery material that it is rendered substantially useless after being subjected to the treatment, where the use involves any amount of stress-strain and resistance to wear. The extraordinary resistance properties of the low unsaturation isoolefin-multiolefin copolymers to either oxidative or mechanical breakdown asssit in making them especially adaptable for improvement by the process of the present invention.

It has been known to produce a valuable interpolymer by reacting a low molecular weight olefin, preferably an isoolefin such as isobutylene, with a low molecular weight multiolefin having from 4 to 14, inclusive, carbon atoms per molecule. Preferably, this second component is a conjugated diolefin having from 4 to 8 carbon atoms per molecule such as isoprene, butadiene, hexadiene, dimethyl butadiene and piperylene, although other diolefins such as dimethallyl and cyclopentadiene may also be used.

The polymerization reaction is carried out at a relatively low temperature, namely, below 0° C. and preferably below −50° C. and down as low as −164° C. in the presence of a suitable catalyst.

Suitable catalysts for use in carrying out the polymerization reaction are solutions of the known Friedel-Crafts polymerization agents. Thus, the active metal halides such as aluminum chloride, bromide, or iodide, or the uranium chlorides, titanium chloride, zirconium chloride, boron fluoride, stannic chloride, silicon chloride, or the like can be employed. The catalyst is dissolved in a low freezing, inert solvent such as a lower alkyl halide or hydrocarbon, or carbon disulfide. Solvents which can be employed include methyl chloride, ethyl chloride, compounds of the "Freon" type such as dichloro-difluoromethane, and the like, low molecular weight, aliphatic hydrocarbons, such as butane, the pentanes, carbon disulfide, etc.

Other catalytic substances which can be used are Friedel-Crafts catalysts complexed with such reagents as olefins, ethers, alcohols, and the like, and oxychlorides, hydroxychlorides, and complex chlorides and bromides of metals of the Friedel-Crafts types, such as aluminum hydroxychloride, titanium hydroxychloride, zirconium hydroxychloride, aluminum bromo chloride, aluminum alcoholates, and hydroxylated aluminum halides. A particularly effective catalyst has been found in a solution of aluminum chloride in methyl chloride. If desired, catalyst promoters and modifiers may be employed to modify the action of the catalyst solution.

In preparing the isoolefin-multiolefin copolymer, the olefinic mixture is first prepared. The isoolefin is preferably present in the feed mixture in the proportion of from 80 to 99 parts by weight, although a proportion as low as 50 parts can be employed, particularly where butadiene is the multiolefin employed. The multiolefin, more particularly a diolefin having from 4 to 8 carbon atoms, is preferably used in a proportion of 20 parts to 1 part; however, an amount up to 50 parts can be used.

With butadiene, the mixture may contain from 50 to 90 parts by weight of isobutylene with from 50 to 10 parts of butadiene. With isoprene, the preferred range is from 95 to 99.5 parts of isobutylene with from 5 to 0.5 parts of isoprene. It should be noted that most of the multiolefins do not copolymerize into the polymer in exactly the proportion in which they are present in the mixture. With a butadiene and isobutylene mixture, approximately 30% of butadiene causes the copolymerization of only about 1% of the butadiene into the final copolymer. Most of the other unsaturated reactants show different polymerization ratios, isoprene having as near to a 1:1 polymerization ratio with isobutylene as any multiolefin so far studied.

This olefinic mixture may be polymerized alone, but it is preferably diluted with an inert diluent or diluent-refrigerant such as liquid ethylene, liquid ethane, liquid methane, liquid propane, liquid butane, liquid methyl or ethyl chlorides, or mixtures of these several inert diluent-refrigerants. These inert diluents can be present in the reaction mixture in the proportion of from 2 to 5 or 6 volumes per volume of the mixed olefinic reactants. Also, an excess of solid carbon dioxide can be used either with or without an excess of an auxiliary diluent-refrigerant. The preferred diluent-refrigerant is liquid ethylene which produces a temperature of from $-98°$ to $-103°$ C. If desired, external cooling may be used. The polymerization reaction is carried out by circulating and/or agitating the cooled olefin-containing mixture with the catalyst solution. The reacting mixture may be circulated rapidly past cooling surfaces such as in a series of vertical or annular tubes submerged in a refrigerant. The catalyst solution is cooled and is applied to the mixture of olefins such as a fine spray or mist onto the surface or beneath the surface of the reacting mixture. The catalyst solution may also be introduced as a jet beneath the surface of the mixture. The catalyst should be rapidly mixed into and intimately dispersed throughout the entire body of the reacting mixture.

The amount of catalyst to be used is determined by the conversion level desired. In general, the desirable amount of catalyst is such as to yield an amount of polymer equal to from 10% up to 100% conversion of the isobutylene present, since the conversion level is usually expressed in terms of the amount of isobutylene. Preferably, the conversion limits are from 40% to 90% of the isobutylene.

The above description of the reactants, catalyst, solvents, and other details of the manufacture of the olefin-diolefin copolymer materials are well known in the art and need not be more fully set forth, but further details may be found in the many patents issued on the subject, especially U. S. 2,356,128.

When the desired amount of polymer has been produced, the reaction mixture containing the polymer is preferably dumped into warm water to bring the solid polymer product up to room temperature and vaporize out the residual materials from the polymerization step. The unreacted, recovered olefins and diluent can be suitably recovered and reused, if desired. Subsequently, the solid polymer is discharged as a slurry in water from which it is filtered, dried and milled for packaging, shipping and use. The catalyst may be inactivated while the mixture is still cold with such agents as alcohols, ethers, ketones, amines and ammonia. Suitable recovery procedures are known as disclosed in, for example, U. S. 2,463,866.

It is also possible to carry out the polymerization of isoolefin-multiolefin mixtures in a solution type process in which the catalyst and reactants are in solution throughout the entire period of the process. Although this type of operation requires certain engineering modifications, it can be carried out along the same general lines as those above described.

This polymerization process yields isobutylene-diolefin copolymers having an average Staudinger molecular weight number within the range between about 20,000 and 200,000 and a Wijs iodine number of from about 1 up to 50. The correspondingly related 8-minute Mooney viscosity values of the copolymers should be at least 15 and may be higher up to 60 or even up to 160 or to the limit of the Mooney viscosity testing equipment. Polymers having extremely low molecular weights either do not cure at all or cure too poorly to be commercially useful, and polymers having molecular weights which are too high can become so tough and leathery that they are extremely difficult or impossible to process on the mill. The exact range of molecular weights obtained depends in part upon the temperature, in part upon the catalyst, in part upon the precise proportions of isobutylene and multiolefin used, and on the known control features. Any of these various isoolefin-diolefin copolymers can be successfully employed to carry out the process of this invention and to prepare the novel compositions herein described. Although the final products may vary somewhat with the precise polymer employed, it is not intended to limit the usable copolymers in any way to those specifically described but merely to show representative and typical kinds of copolymers which can be used. But, it is intended to show that the great benefits obtained in improved properties are peculiar to the treatment of isoolefin-multiolefin copolymers of low unsaturation.

This invention broadly contemplates the heating of low unsaturation isoolefin-multiolefin copolymers, carbon black, from about 0.3% up to a maximum of 3% of dinitroso, dioxime, and similarly related compounds having an ortho or p-quinonoid aromatic nucleus or a compound which can be readily converted into such structure, for instance, by oxidation. The heating of such a mixture under critical conditions of time and temperature effects a thermal interaction between the copolymer and the surface of the carbon black. This thermal interaction involves the dinitroso, dioxime, or other type of quinonoid structure in a chemical combination and requires the presence of such compound within the mixture during the entire or substantially entire heat interaction treatment. It is also necessary that the carbon black be present together with the dinitroso, dioxime or other similar type material, at the period during the heating. The heating may be either with or without simultaneous, subsequent, or intermittent agitation of the mass such as by milling or mastication and the optimum time of the heat treatment will vary somewhat with the temperature, agitation conditions, the kind of carbon black employed, and the amount of dinitroso, dioxime or similar type of compound which is being employed.

The milling or mastication alone without heat treatment of the copolymer, carbon black, and dinitroso or dioxime mixture does not give the enhancement of the physical properties of the final product which is obtained by treatment of the mixture under thermal conditions. Apparently at room temperature and low temperatures, generally the beneficial effects are obtained too slowly to be practical, if any appreciable interaction occurs at all. On the other hand, however, the heating of the copolymer, carbon black, and dinitroso or dioxime containing mixtures without mechanical agitation gives some beneficial results but the effects are somewhat less than those obtained when the combined heat treating and agitation process is employed. Optimum conditions of both temperature and agitation seem to exist for different concentrations of the dinitroso and dioxime compounds. Special care must be exercised, however, in the adjustment of the concentrations of the dinitroso and dioxime compounds in order to use an amount sufficient to give the beneficial effects herein described, and at the same time avoid the effects obtained from the use of too much of the compound, namely, premature partial vulcanization.

To carry out the process of the invention, a mixture of isoolefin-multiolefin copolymer, carbon black and dinitroso, dioxime or other quinonoid aromatic compound in a concentration not less than 0.3% and not greater than 3%, based on the amount of copolymer, are subjected to heating for a controlled time. There is a definite relationship between the concentration of treating material used, the time of heating, the temperature to which the mixture is being subjected, and the degree of improvement obtained in physical properties. In general, the heat treatment without mechanical agitation of the mixture can be carried out in a heating vessel for a period of from about 15 minutes to 7 hours at a heat treating temperature ranging from about 250 to 450° F. Exposing the mixtures to a heating in open steam under static conditions can be satisfactorily employed. Optimum results can be obtained for isobutylene-isoprene copolymer by heat treating the mixture in the presence of about 0.5% of p-dinitroso benzene for about 30 minutes to about one hour at 360 to 380° F. If too small an amount is used there is merely obtained the bruise resistance; if too much, vulcanization results.

Another method by which this novel heat treatment process can be carried out is by heat treating the copolymer, carbon black and dinitroso or dioxime mixture while subjecting it to mechanical agitation as, for example, in a Banbury mixer or on a rubber mill. For best results, in using the Banbury mixer, the total mixture of materials undergoing thermal interaction is heated at a temperature of from about 250 to 450° F. for about 5 to 60 minutes. Preferred conditions are heating and agitation at a temperature within the range of 360 to 400° F. for about 30 minutes. There is a time-temperature relationship for the thermal interaction process when the heating is combined with simultaneous agitation. In general, the higher the temperature used, the shorter the time required to reach the same level of improved results.

The improvements of the invention can also be achieved by alternate heating and mechanical agitation treatment by cycles of the copolymer, carbon black, and dinitroso, dioxime, or other compounds. These heating and agitation steps are conveniently carried out in cycles. For instance, a stationary heating step can be done in an oven or other heating vessel at a temperature of 250 to 450° F. for periods of 15 to 60 minutes followed by a period of agitation, for example, on a mill at 80 to 100° F. for a time of from 2 to 10 minutes. These alternate heating and agitation steps can be repeated as many times as desired or as is convenient with some improvement in physical properties being realized after each cycle.

It is not intended to limit the process of thermal interaction or heat treatment of isoolefin-multiolefin copolymers, carbon black and dinitroso, dioxime or other similar type materials to these particular handling methods since various other procedures, manipulations, and combinations of heating and agitation can be employed to achieve essentially the same end results.

In the various procedures above described, improvements in tensile strength, modulus, internal viscosity, and carbon black particle dispersion for all types of carbon black including channel, furnace and thermal blacks are obtained. These improvements are indicated by the data of the examples shown below.

The type of carbon black suitable for the process and the amount thereof to be admixed with the isoolefin-multiolefin copolymers, thereafter to be subjected to this thermal treatment may be varied widely. Both reinforcing carbon blacks such as channel blacks, and the furnace blacks, as well as the non-reinforcing carbon blacks such as thermal blacks, may be employed. The amount of such carbon black which can be used may range from 20 parts by weight up to 200 parts by weight based on an amount of 100 parts by weight of copolymer. About 50 parts by weight of carbon black per 100 parts of copolymer is believed to be an optimum amount for producing the best products for many purposes.

It is intended for the process and compositions of this invention that any of the channel blacks such as EPC, MPC, HPC and CC can be used, these letters denoting carbon black products well known to the trade. Furnace blacks including SRF, HMF, CF, FF and HAF carbon blacks can be quite satisfactorily used. Thermal blacks can also be employed.

It is also intended that for the process and compositions of this invention the dinitroso materials, the dioximes, and other types of compounds as described hereinafter may be employed.

The aromatic dinitroso compounds which may be employed have the following general formula: Ar(NO)$_2$ wherein Ar is a 1,4-arylene radical or substitution product thereof. Thus there are included such typical compounds as p-dinitroso benzene, p-dinitroso toluene, p-dinitroso xylene, p-dinitroso cymene, 1,4-dinitroso naphthalene, etc. or similar derivatives in which side chains, etc. are introduced on the arylene nucleus for the purpose of conferring modified properties, greater solubilities, etc.

The meta dinitroso aromatic compounds are similarly usable and they are substantially as satisfactory as the para compounds; substantially any para-dinitroso or meta-dinitroso aromatic compound may be used.

Instead of aromatic dinitroso compounds, there may also be used 1,3-aliphatic dinitroso compounds, polynitroso aromatic compounds, and aliphatic dinitroso compounds of the type:

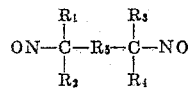

wherein $R_1$, $R_2$, $R_3$ and $R_4$ are radicals other than hydrogen and $R_5$ is a divalent radical.

Certain compounds containing an ortho- or para-quinonoid nucleus of the benzene or naphthalene series or compounds capable of forming an ortho- or para-quinonoid nucleus of the benzene or naphthalene series in the presence of an oxidizing agent can also be used. One such class is the quinone imines, or more particularly, the quinone di-imines. One example of this type of compound is p-quinone dioxime.

The quinonoid substance is defined broadly as containing, or capable of forming on oxidation, an ortho- or p-quinonoid nucleus of the benzene or naphthalene series. When the quinonoid substance contains the quinonoid nucleus directly it is preferably, but not necessarily, used in the presence of an oxidizing agent such as a higher metallic oxide. When the quinonoid substance is merely one capable of forming an oxidation, an ortho- or p-quinonoid nucleus, it necessarily is used in the presence of an oxidizing agent such as a higher metallic oxide, such as lead oxide, and the like.

Thus, a preferred treating material of this type is a di-imine compound containing the structure:

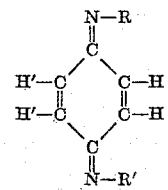

in which R and R' are any desired substituents alike or different, including hydrogen, hydroxy, the halogen, mercaptan groups, phenyl, alkyl, aryl aralkyl, cyclic radicals generally, aliphatic radicals generally, metallic salts generally, ethers and thioethers and in fact substantially any substituent radical having a single bond which can be coupled to nitrogen, and H' is hydrogen, or a second ring structure.

Alternatively, the naphtho-quinones have the formula:

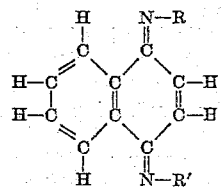

and are similarly usable, R and R' being a desired substituent as above pointed out.

If desired, the new heat treated polymer-carbon black products may be modified by mixing therewith substantial amounts of mineral fillers, pigments, etc., such as pulverized clays, limestone dust, pulverized silica, diatomaceous earth, iron oxide, additional carbon black, and the like. Although these materials may be admixed prior to the heat treatment but preferably thereafter and may be used either in small amounts such as 1/10% or 1% or 5% or so, or in large amounts, for instance, 5% to 20% or 30% to 60% or more as is known in the compounding art. Also, it may be desirable to incorporate a substantial amount of a plasticizer or softener, such as paraffin wax, petrolatum, viscous mineral lubricating oil, a petroleum oil, or a small amount of a relatively non-volatile organic compound such as dibutyl phthalate, or dioctyl phthalate with the heat treated copolymer-carbon black composition. Also, other substances may be added, such as dyes and anti-oxidants, if desired.

The copolymer composition after the present heat treatment can be combined with curing agents, especially sulfur, plasticizers and the like, and suitable sulfurization aids such as "Tuads" (tetramethylthiuram disulfide), or "Captax" (mercaptobenzothiazole), or "Altax" (2,2'-benzothiazyl disulfide) in the usual manner for vulcanization purposes. Non-sulfur curing agents may also be used. For example, additional amounts of the dinitroso compounds, the dioximes, and other quinonoid aromatic compounds may be added in appropriate amounts to serve as curing agents when subsequently treated under the well known conditions to secure vulcanization of the products. The polymer, when so compounded, is cured into an elastic, rubber-like substance by the application of heat within a temperature range of 275 to 395° F. for a time interval ranging from 15 to 120 minutes in the usual way.

The pretreated products of the above described methods when heat interacted in the presence of critical amounts of the dinitroso, dioxime and similar type compounds, are believed to be new compositions and are completely different from products which are obtained through the well known vulcanization reactions involving these compounds. The data clearly show that these novel heat treated products have undergone an interaction involving all three of the components present in the initial mixture, namely, the copolymer, the carbon black, and the dinitroso, dioxime, or other type compound. Furthermore, this interaction takes place only in the presence of critical concentrations of the dinitroso, dioxime or similar type material and only at critical temperature ranges within critical heating periods. Too small an amount of the dinitroso, dioxime or similar compound does not give an adequate treatment to condition the copolymer and thereby effect the physical properties, while on the other hand, too great an amount of the material results merely in a premature curing.

Although isoolefin-multiolefin copolymers and carbon black compositions have been widely used as cured products in inner tube stocks as well as for various other purposes, they have been previously unsatisfactory for abrasion-resistant purposes as exemplified by tire tread stocks. This deficiency in the compounding of isoolefin-multiolefin copolymers is well known in the art and its solution as exemplified by the instant invention is an outstanding feature of the new compositions. These mixtures differ from any mixtures previously made, and are characterized by increased tensile strength, increased resilience, decreased internal viscosity, and a lower heat build up during flexure and when subjected to abrasion and vibrations. The compositions, on superficial observation, are similar to known mixtures except that they appear softer and somewhat smoother and blacker; however, in their use, and in the results obtained upon testing, their differences are striking.

Although it is not intended to limit the invention to any particular physical or chemical theory, it is suggested from studies of the reactions carried out and data obtained therefrom, as an explanation for the results given by this process, that an interaction takes place between the surface of the carbon black particles and the copolymer molecules through a bond during the heating period. Such an effect is somewhat indicated from the known factors concerning the presence of "bound" copolymer. The expression "bound" copolymer is used to characterize the portion of the copolymer in the final heat treated copolymer-carbon black mixture which is insoluble when solution experiments are conducted on the unvulcanized mixture.

It is thus suggested as a reasonable explanation that there is a kind of bond formed through the agency of the dinitroso or dioxime molecules, which bond is formed between the carbon black surface and the copolymer chain during the heat interaction to give an entirely new type of "bound," heretofore unknown. The formation of this so-called bond or bridge occurs during the heat treatment of the mixture at critical temperatures and for critical periods of time and its formation is assisted by the agitation of the mass such as by milling or mastication. Likewise, during the heat treatment and agitation period, a greater dispersion of the carbon particles takes place and thus the individual carbon particles can act as bridges between the molecular chains of the polymer rather than as large irregular agglomerates. This allows a great degree of orientation of the polymer chains and contributes both to the greater strength and reduced internal viscosity obtained by the treatment. It has also been shown that the ability of the copolymer chains to orient within the mass, and consequently to affect the internal viscosity, is related to the abrasion resistance of the ultimate cured polymer vulcanizate.

"Bound" rubber is known in natural rubber compositions, but this expression, as used in the literature, appears to refer to a different type of "bound" rubber than to that type herein described. The previously used expression, "bound" rubber, refers to a composition which readily reverts to a soluble type rubbery material.

From what has been said before as to the treating process, it will be understood that various copolymers of the olefin-diolefin type, and especially those having molecular weights of from 20,000 to 200,000 and iodine numbers below 50, such materials having been collectively known under the general term of "GR-I," are applicable to this process. It may be desirable to describe more specifically the treated or reacted products which are believed to be new and to mark this definite forward step in rubber technology. These treated compounds are true chemical combinations since the heat treatment effects a kind of bonding reaction between the carbon particles, the copolymer chains and the dinitroso or dioxime material which was heretofore unknown.

What has been said above is particularly applicable to unvulcanized, heat pretreated copolymer-carbon black compositions with the dinitroso, dioxime, or similar type products, but the vulcanized products are equally new whether the vulcanization is effected by the ordinary sulfur cures or the well-known non-sulfur cures carried out by the use of the quinone dioximes, or dinitroso benzene, and their equivalents in additional amounts as vulcanizing agents. In both instances, it will be noted that the pretreatment in the presence of the appropriate reactants has effected a chemical combination between the black and the copolymer through a molecular bond which combination is then vulcanized in the manner hitherto known.

The present products have been especially indicated as tire tread and tire casing materials, since such use has not heretofore been made of GR-I polymers. Such polymers have long been thought useless for that purpose. The present invention, therefore, extends the applicability of these polymers to an entire range of usefulness which has previously been reserved for natural rubber alone. In addition, these products can be used successfully for many other purposes, for example, for inner tube stocks, electrical insulation, lining for tanks, for rolls, for furniture, upholstery and bedding, elastic pads, shoe soles, waterproof fabrics, and the like. In all these instances, the treated copolymer not only possesses the improved qualities added by the pretreatment, but also retains the high chemical resistance of the original untreated copolymers.

The following examples are presented to illustrate the process but it is not intended that the invention be specifically limited thereto.

EXAMPLE 1

*Heat treatment with dinitroso benzene (Polyac)*

An experiment was carried out to show the effect of the heat interaction process when it is carried out in the presence of Polyac (dinitroso benzene) using channel carbon black (containing surface oxygen) and isobutylene-isoprene copolymer. The rubbery copolymer used here was made according to U. S. Patent 2,356,128, using about 97% isobutylene and 3% isoprene as polymerization feed; this rubber had a 60–70 Mooney value and an iodine number (Wijs) of about 10.0. The details of the compositions prepared in this experiment are shown in Table 1.

TABLE 1

| | Parts by weight | |
|---|---|---|
| Sample Number | 1 | 2 |
| Isobutylene-isoprene copolymer | 100.0 | ¹ 100.0 |
| MPC Black | 50.0 | ¹ 50.0 |
| Stearic Acid | 0.5 | ¹ 0.5 |
| Polyac (dinitroso benzene) | | ¹ 0.5 |
| Zinc Oxide | 5.0 | ² 5.0 |
| Sulfur | 2.0 | ² 2.0 |
| Tetramethylthiuram disulfide | 1.0 | ² 1.0 |
| 2,2'-Benzothiazyl disulfide | 1.0 | ² 1.0 |

¹ Portions for thermal interaction.
² Portions for curing.

A carbon black masterbatch was prepared in a Banbury mixer using the proportions indicated above. The mixing was done for six minutes under cool conditions (maximum temperature of 130° C.). A portion of Sample No. 1 was taken out to serve as a control.

Each of Samples Nos. 1 and 2 were then returned to the Banbury mixer for heat treatment for 40 minutes to maximum temperature of 400–425° F. The samples were masticated continuously for 40 minutes with full steam pressure.

The indicated curatives were added to thus treated samples on a laboratory mill and the resulting compositions cured for 20 minutes at 307° F.

The physical data obtained on these cured samples is shown in Table 2 below. The data on the two samples and that obtained on the control are shown.

TABLE 2

| | Control | Sample No. 1— No Polyac Heat Treated | Sample No. 2— Polyac Present Heat Treated |
|---|---|---|---|
| Modulus @: | | | |
| 100% Elongation | 225 | 225 | 200 |
| 200% Elongation | 475 | 560 | 640 |
| 300% Elongation | 850 | 1,225 | 1,375 |
| 400% Elongation | 1,350 | 1,950 | 2,175 |
| 500% Elongation | 2,000 | 2,625 | 2,850 |
| 600% Elongation | 2,725 | | |
| Tensile Strength | 3,250 | 3,125 | 3,100 |
| Percent Elongation | 690 | 590 | 560 |
| Damping. $\eta f \times 10^{-6}$ (poises$\times$c.p.s.): | | | |
| @ 30° C | 7.85 | 4.23 | 3.63 |
| @ 50° C | 4.98 | 2.41 | 2.04 |
| @ 70° C | 3.45 | 1.63 | 1.39 |
| Specific Resistivity (Ohm Cm.) | 4.62×10⁷ | 2.40×10⁸ | 8.03×10¹² |

In Table 2 data are presented which clearly demonstrate that the Polyac treated composition has superior physical properties to those of untreated compositions when the thermal interaction technique is used on both samples. The Polyac stock has higher modulus and tensile strengths and lower internal viscosity.

The stress-strain data shown above were obtained by standard ASTM procedures. It is plotted in Figure II.

The dynamic behavior of the vulcanized samples was studied by the free vibration in compression of a cylindrical pellet in a weighted pendulum apparatus frequently referred to as the Yerzley oscillograph. The damping or hysteresis effect is expressed as a product of internal viscosity and frequency since in free vibration systems the frequency cannot be controlled at a constant value. The absolute damping effect or the work of compression that is absorbed as heat is related to frequency and internal viscosity by the following equation:

$$\text{Absolute damping} = W\eta = 2\pi^2 f \eta A M^2 / h$$

where $f$ = frequency
$\eta$ = internal viscosity
$M$ = amplitude
$A$ = cross sectional area of pellet
$h$ = height of pellet M, the amplitude, is controlled by the amount of weights added to the pendulum, A and h are dimensional constants so $\eta f$ is directly related to the energy loss upon vibration. The damping term, $\eta f$, is directly proportional to the internal viscosity and inversely proportional to the elasticity or resilience of the vulcanized sample.

Measurements of this $\eta f$ function were made at 50° C. on Samples 1 and 2. These comparative measurements are plotted in Figure III.

The electrical resistivity data obtained on the samples is shown as a plot in Figure IV.

EXAMPLE 2

*Commercial experiments on Polyac-heat treated compositions*

An experimental program for building and testing tires made from the herein disclosed specially heat-treated isobutylene-isoprene copolymer using Polyac was designed and carried out. The results obtained clearly demonstrate that high quality tires of greatly improved qualities can be prepared from polymers so treated.

The program was set up to build and test four groups of experimental tires and compare them with a fifth control group as the following outline shows.

*Group 1.*—Copolymer tires wherein all the components are standard type formulations.

*Group 2.*—Copolymer tires wherein all the components are prepared from compounds derived from special heat treated copolymer system using Polyac.

*Group 3.*—In these tires, the tread is prepared from the heat treated system using Polyac while the breaker and carcass are of standard formulations of the copolymer.

*Group 4.*—In these tires, the tread is prepared from standard formulations of the copolymer while the breaker and carcass are from the heat treated copolymer-carbon black systems using Polyac.

*Group 5.*—A standard tire from 60% diolefin-styrene copolymer and 40% natural rubber. The tread is cold diolefinstyrene copolymer (GR–S).

In preparing the large masterbatch, the following materials were mixed under "cool" conditions in a Banbury mixer:

| Component: | Parts by weight |
|---|---|
| Isobutylene-isoprene copolymer | 100.0 |
| MPC carbon black | 50.0 |
| Stearic acid | 0.5 |
| Dinitroso benzene (Polyac) | 0.5 |

The batches of the above mixture were masticated for about 7 or 8 minutes. Cooling was employed in order to keep the temperature below about 220–230° F.

The heat treatment operation was carried out by continuously mixing the ingredients in several batch lots. Each batch was continuously mixed for 30 minutes at the low speed (20 R. P. M.) on the Banbury mixer. Cooling water was employed to delay the rate of heat build-up. Automatic power records were taken to describe the extent of the interaction between the ingredients. These power records are shown in Figure V. The control containing no Polyac is indicated as Sample 4 by dashed lines in Figure V.

It can be seen that since the p-dinitroso benzene is an active ingredient, at vulcanization temperatures it causes cross linking of the copolymer chains. This effect is shown in the curves of Figure V. During the first few minutes of the heat treatment, the power required by the Banbury mixer diminishes. This is the thermoplastic effect which occurs as the mass becomes hot. When the temperature of the batch reaches the vulcanization range, say 250–340° F., the dinitro benzene reaction is started. The resultant cross-linking process is characterized by a stiffening of the polymer system. This effect is evident from the fact that the initial trend in power consumption is reversed, that is, more power is required. This reaction is complete after 6 or 7 minutes, as is indicated by the maximum shown in the power consumption curve. The effect of continued heat treatment is to break down whatever cross-linked structure has been formed. After about 22 minutes the mass requires no more power than does a similar mass given a hot Banbury treatment without p-dintroso benzene. The curve for the latter case is drawn as a broken line in Figure V.

Samples from the large batches, both before and after heat treatment, were tested in the laboratory. Sulfur and accelerators were then added according to the following formulation which is based on 100 parts of polymer:

| | |
|---|---|
| Zinc oxide | 5.0 |
| Sulfur | 2.0 |
| Tetramethylthiuram disulfide | 1.0 |
| 2,2'-benzothiazyl disulfide | 1.0 |

A series of vulcanizates was prepared by curing the compounds for 20, 40, 60 and 90 minutes at 307° F. Yerzley pellets used for measuring damping properties were vulcanized for 45 minutes at 307° F.

The data obtained from the above samples are shown in Table 3.

Mooney viscosity and extrusion properties were obtained from the blends before final compounding. The large decrease in the final Mooney viscosity value illustrates the extent to which the cross-linked structure is broken after the initial dinitroso benzene reaction.

The heat interaction treatment produces systems which process more smoothly. The rate of extrusion is seen to be almost doubled as a result of the Banbury heat treatment.

The heat treated product has much more elastic tendency, it is shiny black; its surface is relatively smooth and its walls are of uniform thickness. The control sample, on the contrary, is gray-black and non-lustrous; its surface is very rough and its walls very irregular. Samples extruded in the factory showed remarkable similarity to those tested in the laboratory.

The vulcanizates show higher extension modulus and high tensile strengths. The elasticity or resilience of the vulcanizate is greatly enhanced by the heat interaction treatment. The damping effect is reduced almost 40% by this treatment.

For the preparation of the experimental tires, the Banbury heat treated masterbatch and standard control compounds which received no heat treatment were used as foundations. The recipes for the compounds used in manufacturing the various parts of the tires are shown in Table 4.

TABLE 4.—TIRE COMPOUNDS

| | Special Compounds | | |
|---|---|---|---|
| | Tread | Breaker | Carcass |
| Copolymer | 100.0 | 100.0 | [1] 100.0 |
| MPC Black | 50.0 | 50.0 | [1] 50.0 |
| Stearic Acid | 0.5 | 0.5 | [1] 0.5 |
| Polyac (dinitroso benzene) (30% in inert filler) | 0.5 | 0.5 | [1] 0.5 |
| Plasticizer Oil | 5.0 | 8.0 | [2] 12.5 |
| Zinc Oxide | 5.0 | 5.0 | [2] 5.0 |
| Sulfur | 2.0 | 2.0 | [2] 2.0 |
| Tuads (tetramethylthiuramdisulfide) | 1.0 | 1.0 | [2] 1.0 |
| Altax (2,2'-Benzothiazyl disulfide) | 1.0 | 1.0 | [2] 1.0 |

| | Regular Compounds | | |
|---|---|---|---|
| | Tread | Breaker | Carcass |
| Copolymer | 100.0 | 100.0 | 100.0 |
| HMF Black | | | 20.0 |
| FF Black | | | 20.0 |
| EPC Black | | 20.0 | |
| MPC Black | 40.0 | | |
| HAF Black | | 20.0 | |
| Plasticizer Oil | | 5.0 | 10.0 |
| Stearic Acid | 1.0 | | |
| Zinc Oxide | 5.0 | 5.0 | 10.0 |
| Sulfur | 2.0 | 2.0 | 2.0 |
| Tuads (tetramethylthiuram disulfide) | 1.0 | 1.0 | 1.0 |
| Altax (2,2'-Benzothiazyl disulfide) | 1.0 | 1.0 | 1.0 |

[1] Portions for thermal interaction.
[2] Portions for curing.

TABLE 3

| Treatment of Masterbatch | "Cool" Mixed Only | | | | Heat Interacted | | | |
|---|---|---|---|---|---|---|---|---|
| Mooney Viscosity: | | | | | | | | |
| 2' @ 100° C | 108 | | | | 73 | | | |
| 8' @ 100° C | 110 | | | | 72 | | | |
| Extrusion Properties: | | | | | | | | |
| A. Inches per Minute | 29.0 | | | | 54.0 | | | |
| B. Grams per Minute | 44.8 | | | | 110.2 | | | |
| C. Ratio of B/A | 1.54 | | | | 2.04 | | | |
| Vulcanization, Min. @ 307° F | 20 | 40 | 60 | 90 | 20 | 40 | 60 | 90 |
| Tensile Strength (#/In²) | 2,840 | 2,830 | 2,750 | 2,750 | 3,140 | 3,240 | 3,120 | 2,950 |
| Modulus @ (#/In²): | | | | | | | | |
| 100% | 200 | 270 | 270 | 380 | 230 | 280 | 310 | 310 |
| 200% | 500 | 750 | 800 | 930 | 520 | 740 | 810 | 900 |
| 300% | 980 | 1,370 | 1,450 | 1,620 | 1,130 | 1,500 | 1,570 | 1,750 |
| 400% | 1,580 | 2,050 | 2,160 | 2,320 | 1,840 | 2,300 | 2,400 | 2,530 |
| 500% | 2,200 | 2,680 | 2,750 | | 2,460 | 3,030 | | |
| 600% | 2,770 | | | | 3,060 | | | |
| Percent Ultimate Elongation | 625 | 525 | 500 | 460 | 620 | 545 | 495 | 460 |
| Damping, $\eta f \times 10^{-6}$ (poises×c. p. s.) | 3.05 | | | | 1.88 | | | |

Uncured samples of all these tire compounds, both regular and special, were evaluated in the laboratory. They were vulcanized at 307° F. over a range of time. Table 5 below shows the stress-strain data obtained from these specimen samples. The symbol R denotes the case for regular batches, and S that for special batches.

The conditions of controlled road tests are as follows:

|  | Tread wear test | Carcass test |
|---|---|---|
| Test car | 1951 sedan | 1951 sedan +150#. |
| Inflation of tires, lbs | 24 | 24. |
| Speed | 55% mileage—50-55 M. P. H. 40% mileage—60-65 M. P. H. 5% mileage—70 M. P. H. | 80% mileage—60-70 M. P. H. 20% mileage—70 M. P. H. |

TABLE 5.—LABORATORY EVALUATION OF TIRE STOCKS

| Vulcanized, Min. @ 307° F. | 20 | | 30 | | 45 | | 60 | |
|---|---|---|---|---|---|---|---|---|
|  | R | S | R | S | R | S | R | S |
| Modulus @ #/in.²: |  |  |  |  |  |  |  |  |
| 100% | 140 | 140 | 160 | 150 | 180 | 175 | 200 | 175 |
| 200% | 240 | 325 | 300 | 400 | 350 | 450 | 375 | 490 |
| 300% | 375 | 740 | 460 | 890 | 550 | 1,000 | 600 | 1,050 |
| 400% | 540 | 1,310 | 670 | 1,510 | 800 | 1,675 | 875 | 1,750 (¹) |
| 500% | 810 | 1,890 | 1,000 | 2,125 | 1,210 | 2,325 | 1,310 | 2,375 |
| 600% | 1,350 | 2,350 | 1,650 |  |  |  |  |  |
| 700% | 2,025 |  |  |  |  |  |  |  |
| Tensile Strength, #/in.² | 2,240 | 2,400 | 2,100 | 2,510 | 1,750 | 2,560 | 1,615 | 2,575 |
| Percent Elongation | 730 | 605 | 670 | 575 | 585 | 540 | 560 | 530 |
| Modulus @ #/in.²: |  |  |  |  |  |  |  |  |
| 100% | 150 | 175 | 175 | 200 | 190 | 200 | 200 | 225 |
| 200% | 275 | 450 | 340 | 590 | 400 | 640 | 425 | 650 |
| 300% | 475 | 1,025 | 600 | 1,250 | 720 | 1,350 | 775 | 1,375 |
| 400% | 680 | 1,875 | 975 | 1,960 | 1,160 | 2,075 | 1,250 | 2,140 (²) |
| 500% | 1,250 | 2,300 | 1,525 | 2,550 | 1,750 | 2,675 | 1,860 |  |
| 600% | 1,925 |  | 2,225 |  | 2,425 |  |  |  |
| 700% | 2,600 |  |  |  |  |  |  |  |
| Tensile Strength, #/in.² | 2,775 | 2,650 | 2,600 | 2,750 | 2,525 | 2,800 | 2,450 | 2,650 |
| Percent Elongation | 730 | 580 | 660 | 530 | 610 | 510 | 585 | 485 |
| Modulus @ #/in.²: |  |  |  |  |  |  |  |  |
| 100% | 160 | 175 | 175 | 200 | 200 | 240 | 200 | 240 |
| 200% | 300 | 500 | 360 | 560 | 450 | 660 | 450 | 700 |
| 300% | 525 | 1,100 | 660 | 1,225 | 800 | 1,425 | 850 | 1,450 |
| 400% | 875 | 1,775 | 1,090 | 1,975 | 1,300 | 2,200 | 1,375 | 2,275 (³) |
| 500% | 1,400 | 2,375 | 1,700 | 2,625 | 1,975 |  | 2,100 |  |
| 600% | 2,300 |  | 2,460 |  | 2,775 |  |  |  |
| 700% | 2,900 |  |  |  |  |  |  |  |
| Tensile Strength, #/in.² | 3,100 | 2,775 | 3,040 | 2,875 | 2,950 | 2,825 | 2,825 | 2,800 |
| Percent Elongation | 735 | 575 | 675 | 540 | 610 | 495 | 590 | 490 |

¹ Carcass.
² Breaker.
³ Tread.

In general, the special compounds are characterized by higher moduli values and appear to cure faster. With the heat treated systems, the tensile strength (breaking strength) either remains constant or increases slightly as the cure is lengthened. The stress-strain analysis of the compounds are given in Figure VI. Comparative vulcanization rates are shown in Figure VII. In the (A) graph the cures are shown to be the same rate since curves are parallel. The specially treated compounds, when cured at the same time and temperature, reach much higher states of cure, i. e., much higher modulus. In the (B) graph the curves show that the tensile drop with extended curing is not obtained in specially treated compounds as with the untreated compounds.

Measurements of $\eta f$ (the damping factor) were made at three temperatures. If the logarithm of $\eta f$ for several samples is graphed against the reciprocal of the absolute temperature, a set of essentially parallel lines is obtained. An Arrhenius plot of this type, shown for tread and breaker compounds, in Figure VIII shows the increased resilience of the special systems over the regular system compounds. The increased resiliency which characterizes the specifically heat interacted systems containing Polyac is well shown by these curves.

The groups of tires were made up substantially in accordance with standard, commercial operations for making tires. The details of the construction of these tire groups are shown above.

In controlled road tests carried out under regular service conditions, the tread wear and carcass life of the five groups of tires were tested. A total of 10,000 miles of road service has been obtained, the first 5,000 miles testing tread wear and the second 5,000 miles testing carcass adequacy.

Tires are tested on both front and rear wheels. The driving route includes dirt, gravel, and paved roads.

The test results of the first 3000–4000 miles of the road tests run under these conditions are shown in Table 6. The road wear rating of all the isobutylene-isoprene tire treads is superior to that of the diolefin-styrene (GR-S) tread used on the control tire. The ratings are based on the performance of the controls (Group 5) (natural rubber and GR-S) set arbitrarily at 100.

TABLE 6

| Group | Temp., °F. | | Wear | | Rating | |
|---|---|---|---|---|---|---|
|  | Atm. | Tire | Gauge, percent | Weight, Grams | Gauge | Weight |
| 1 | 92 | 248 | 4.5 | 330 | 116 | ¹ 108 |
| 2 | 93 | 228 | 3.4 | 288 | 153 | ¹ 123 |
| 3 | 93 | 230 | 4.3 | 282 | 121 | ¹ 126 |
| 4 | 95 | 230 | 4.9 | 351 | 106 | ¹ 101 |
| 5 | 93 | 218 | 5.2 | 355 | 100 | ¹ 100 |
| 1 | 77 | 227 | 7.9 | 634 | 114 | ² 110 |
| 2 | 72 | 218 | 6.3 | 555 | 143 | ² 126 |
| 3 | 87 | 208 | 6.8 | 532 | 133 | ² 132 |
| 4 | 92 | 220 | 8.3 | 642 | 108 | ² 109 |
| 5 | 89 | 200 | 9.0 | 699 | 100 | ² 100 |
| 1 | 99 |  | 11.4 | 927 | 121 | ³ 119 |
| 2 | 107 |  | 8.9 | 831 | 155 | ³ 132 |
| 3 | 97 |  | 9.5 | 804 | 145 | ³ 137 |
| 4 | 102 |  | 12.5 | 1,011 | 106 | ³ 109 |
| 5 | 101 |  | 13.8 | 1,099 | 100 | ³ 100 |

¹ 1,168 miles.
² 2,336 miles.
³ 3,504 miles.

The tire temperatures are taken with a needle pyrometer immediately after stopping the test car. These measured temperatures are probably slightly lower than the actual ones.

The wear as measured by gauge refers to the original depth of the tread. The wear as measured by weight is the actual loss in weight of the tire.

The rate of tread wear in the first 3500 miles of the test is shown in Figure IX. The data are based on changes in tread depth.

Tread wear data resulting from completion of the total 10,000 miles testing are shown in Table 7.

TABLE 7

| Group | Description | Wear Rating [a] | | | |
|---|---|---|---|---|---|
| | | Tread Test[b] | | Carcass Test[c] | |
| | | 5,840 miles | | 10,304 miles | |
| | | Gauge | Weight | Gauge | Weight |
| 1 | Standard | 115 | 109 | 109 | 103 |
| 2 | Special | 146 | 132 | 128 | 125 |
| 3 | Special tread Standard Carcass. | 144 | 144 | 123 | 133 |
| 4 | Standard tread Special carcass. | 108 | 111 | 100 | 120 |
| 5 | Control | 100 | 100 | 100 | 100 |

[a] Relative to the GR-S control as 100. Numbers larger than 100 signify less wear than the control.
[b] Designed primarily as a tread wear test—50-60 M. P. H., 5% at 70 M. P. H., 24 lbs. inflation pressure, 5 passenger equivalent load.
[c] Designed to test carcass adequacy—60-70 M. P. H., 20% at 70 M. P. H., 24 lbs. inflation pressure, 5 passenger equivalent load plus 150 lb. overload.

This table employs 100 as the control rating. Numbers larger than 100 signify less wear than the control. These tests conclusively show tires of isobutylene-isoprene copolymers treated by the method of the invention to be superior to the control tires in every respect.

EXAMPLE 3

*Effect of time and temperature on Polyac-heat treatment*

Both the time and temperature conditions must be carefully controlled in order to obtain optimum results and maximum benefits. This necessity for control was demonstrated by an experiment in which a mixture, like the portions used for thermal interaction in Example 2, was mixed under normal conditions. Thereafter, the mixed composition (hereafter called Sample No. 5) was subjected to heat treatment in a Banbury at 40 R. P. M. with a very rapid increase in temperature. The heat history of this sample is compared in Figure X to that of Sample 3 from Example 2.

The uncontrolled time and temperature relationship had the deleterious effect of decomposing the Polyac compound before it had an opportunity to exercise its effect in the heat interaction and, consequently, give the desirable changes in the composition. As a result of this excessive speed and temperature of the heat interaction process, the resultant physical properties of the composition were very inferior to those of the Polyac-treated-carbon black-copolymer mixtures of this invention.

The data showing this superiority is tabulated in Table 8 below.

TABLE 8

| | Sample 3 | Sample 5 |
|---|---|---|
| Modulus @: | | |
| 100% Elongation | 250 | 175 |
| 200% Elongation | 620 | 450 |
| 300% Elongation | 1,250 | 950 |
| 400% Elongation | 1,975 | 1,500 |
| 500% Elongation | 2,580 | 2,025 |
| 600% Elongation | | |
| Tensile Strength | 2,780 | 2,425 |
| Percent Elongation | 550 | 580 |
| Damping, $\eta f \times 10^{-6}$ (poises × c. p. s.): | | |
| @ 30° C | | |
| @ 50° C | 2.75 | 3.22 |
| @ 70° C | | |
| Specific Resistivity (Ohm Cm.) | 3.85×10⁹ | 5.0×10⁷ |
| Maximum Banbury Temperature (chart) | 412° F. | 495° F. |
| Pyrometer | 455° F. | ca. 600° F. |

EXAMPLE 4

*Heat-mill cycle experiments*

An experiment was carried out in which a mixture of isobutylene-isoprene copolymer and furnace black (SRF carbon black) was subjected to a series of heat-mill cycling operations. The compositions are shown in Table 9 below. In this case, the carbon black employed does not have any appreciable oxygen on its surface as a result of the method of its preparation.

TABLE 9

| Portion for thermal interaction: | Parts by weight |
|---|---|
| Isobutylene-isoprene copolymer | 100 |
| SRF black | 50 |
| Stearic acid | 0.5 |
| Polyac | 0.5 |
| Portion for curing: | |
| Zinc oxide | 5.0 |
| Sulfur | 2.0 |
| Tetramethylthiuram disulfide | 1.0 |
| 2,2'-Benzothiazyl disulfide | 1.0 |

The portion for thermal interaction was first heated for ½ hour at 320° F. in steam under static conditions then subjected to 5 minutes of milling. This heat-mill cycle was repeated 0, 1, 3, 5, 8 and 12 times using six separate portions of the masterbatch. The vulcanizing agents were then added and the samples cured for 45 minutes at 307° F. In each case, as the number of heat-mill cycles was increased, the physical properties of the cured composition improved.

These results are in contrast to those obtained with furnace carbon blacks (non-oxygenated blacks) when they are admixed with polymer and subjected to heating and/or mastication without the presence of Polyac. No appreciable improvement is obtained in either damping properties, stress-strain, or other physical properties of the mixtures so treated.

EXAMPLE 5

*Effect of carbon black on thermal interaction with Polyac*

This experiment is presented to show the effect of the presence of the carbon black. These data show that the heat interaction effects obtained with the copolymer and Polyac requires the presence of the carbon black in order to be effective. The details of the experiment are shown below in Table 10.

TABLE 10

| Sample No | 6 | 7 | 8 |
|---|---|---|---|
| Isobutylene-isoprene copolymer | 100.0 | 100.0 | [1] 100.0 |
| SRF Black | | | [1] 50.0 |
| Stearic Acid | 0.5 | 0.5 | [1] 0.5 |
| Polyac | | 0.5 | [1] 0.5 |
| Zinc Oxide | 5.0 | 5.0 | [2] 5.0 |
| Sulfur | 2.0 | 2.0 | [2] 2.0 |
| Tetramethylthiuram disulfide | 1.0 | 1.0 | [2] 1.0 |
| 2,2'-Benzothiazyl disulfide | 1.0 | 1.0 | [2] 1.0 |

[1] Portions for thermal interaction.
[2] Portions for curing.

The portions designated for thermal interaction were heat-mill cycled for 12 times in the same manner as described above. The samples were cured for 45 minutes at 307° F.

The effects of thermal treatments of polymer alone, polymer and Polyac, and polymer, Polyac and carbon black are shown in the curves of Figure XI in which the stress-strain data are plotted. These curves show that the carbon black forms a necessary part of the heat interaction process.

The data obtained on the samples, shown below in Table 11, also indicate that carbon black is necessary in order to achieve maximum results with the heat interaction method.

TABLE 11

| Sample No. | 6 | 7 | 8 |
|---|---|---|---|
| Modulus @: | | | |
| 100% Elongation | 330 | 400 | 380 |
| 200% Elongation | 670 | 1,025 | 1,150 |
| 300% Elongation | 985 | 1,500 | 1,900 |
| 400% Elongation | 1,270 | 1,900 | -------- |
| Tensile Strength | 1,380 | 1,950 | 2,150 |
| Elongation | 440 | 410 | 340 |
| Damping, $\eta f \times 10^{-6}$ (poises × c. p. s.) | 2.37 | 1.61 | 1.43 |

EXAMPLE 6

*Static heat treatment with Polyac using reinforcing black*

A masterbatch of isobutylene-isoprene copolymer and SRF carbon black (a reinforcing carbon) was prepared. The mixture contained about 50% by weight of carbon black. To about one-half of this mixture was added about 0.5% by weight of dinitroso benzene (Polyac). The other half was retained and tested as a control. Samples of the control and the Polyac treated material were exposed to a temperature of 320° F. in a steam digester under conditions of static heating for 8 hours. Samples of these treated materials were cured using the standard curing recipe shown above.

Physical data were obtained on the uncured and cured samples. These data are tabulated in Table 12 below.

TABLE 12

| | Control, No Polyac | 0.5% Polyac |
|---|---|---|
| Electrical Resistivity of Unvulcanized Compounds: | | |
| 8 hrs. @ 320° F | $1.9 \times 10^7$ | $>10^{15}$ |
| Electrical Resistivity after Vulcanization: | | |
| 8 hrs. @ 320° F | $1.2 \times 10^8$ | $1.0 \times 10^{15}$ |
| Stress-strain Properties (8 hrs. @ 320° F.): | | |
| Tensile strength | 1,845 | 2,275 |
| Modulus @— | | |
| 100% Elongation | 220 | 225 |
| 200% Elongation | 485 | 825 |
| 300% Elongation | 885 | 1,610 |
| 400% Elongation | 1,190 | 2,200 |
| 500% Elongation | 1,540 | -------- |
| Elongation | 600 | 410 |
| Internal Viscosity ($\eta f \times 10^{-5}$) (Yerzley Method): | | |
| 8 hrs. @ 320° F | 20.8 | 16.1 |

These results show that a static heat treatment of copolymer and furnace carbon black with Polyac present in the mixture, gives great improvements in physical properties of both the cured and uncured products. This indicates that agitation of the mass during the thermal treatment is not necessary in order to get appreciable improvements in physical properties.

EXAMPLE 7

*Static heat treatment with Polyac using non-reinforcing black*

A mixture of isobutylene-isoprene copolymer and about 50 weight percent of a non-reinforcing thermal carbon black was prepared. Samples, both with and without Polyac, were subjected to static heat treatment for 1 hour at 320° F. Portions of each were then used to prepare specimens compounded and cured according to the standard recipe shown above. The physical properties were then determined.

In addition to stress-strain data and Yerzley data on internal viscosity by the free vibration method, a study was made of the elastic or dynamic properties of the samples. These studies were carried out in an apparatus where the systems were observed under forced vibrations. These systems operate under conditions of constant frequency and amplitude wherein the thin samples are flexed under tension. A 3" x ¼" x .075" sample was used under 10% static extension. A superimposed dynamic deflection of an additional 10% was applied by the eccentric at a frequency of 16 cycles per second. Relative damping and dynamic modules were determined with a strain gauge and a linear variable transformer in conjunction with an oscilloscope. The internal viscosity in poises was determined from the dynamic modulus and relative damping relationship:

$$\eta \text{ (poise)} = \frac{2k \text{ (percent relative damping)}}{\pi^2 f \text{ (200} - \text{percent relative damping)}}$$

$\eta$ = internal viscosity
$k$ = dynamic modulus (dynes/cm.$^2$)
$f$ = frequency in cycles/second
Percent = relative damping The dynamic properties of the thermal black-copolymer systems under conditions of forced vibration are shown in Table 13. Other physical data of the samples are shown in Table 13 also.

The test data shown in Table 13 were obtained on samples cured for 40 minutes at 307° F.

TABLE 13

| | Control, No Polyac | | 0.5% Polyac | |
|---|---|---|---|---|
| | Series A [1] | Series B [2] | Series A [1] | Series B [2] |
| Stress-strain Properties: | | | | |
| Tensile Strength | 975 | 950 | 1,000 | 1,300 |
| Modulus @— | | | | |
| 100% Elong | 180 | 190 | 180 | 200 |
| 200% Elong | 300 | 340 | 375 | 500 |
| 300% Elong | 430 | 490 | 610 | 850 |
| 400% Elong | 550 | 675 | 790 | 1,110 |
| 500% Elong | 770 | 850 | -------- | -------- |
| Elongation | 585 | 530 | 500 | 480 |
| Dynamic Properties (Forced Vibration): | | | | |
| Percent Relative Damping | 24.1 | 23.9 | 22.2 | 19.8 |
| Dyn. Mod., $k \times 10^{-7}$ dynes/cm.$^2$ | 2.89 | 2.96 | 2.39 | 2.08 |
| Viscosity, $\eta \times 10^{-4}$ poises | 5.01 | 5.08 | 3.78 | 2.80 |

[1] Series A—no prior heat treatment.
[2] Series B—1 hour prior heat treatment.

Outstanding results are shown in the 300 to 400 lb. increase in tensile strengths obtained after heat treatment of the mixtures containing Polyac. There is also a remarkable reduction in internal viscosity after heat treatment of these samples.

EXAMPLE 8

*Commercial experiments using thermal (non-reinforcing) carbon black and Polyac*

Masterbatches of carbon black, P-33 (thermal carbon black), where subjected to thermal treatment for 30 minutes in a Banbury with a maximum temperature of 400–420° F. The mixtures were cured and tested for physical properties. The data so obtained are shown in Table 14.

TABLE 14

| Sample No | 9 | 10 |
|---|---|---|
| | P-33 (Control) | P-33 Black, Polyac (0.5%) |
| Stress-strain Properties: | | |
| Tensile Strength | 950 | 1,330 |
| Modulus @— | | |
| 100% Elongation | 205 | 205 |
| 200% Elongation | 375 | 470 |
| 300% Elongation | 550 | 850 |
| 400% Elongation | 700 | 1,155 |
| Elongation | 500 | 460 |
| Internal Viscosity $\eta f \times 10^{-5}$ (Yerzley Method) | 7.77 | 8.15 |
| Dynamic Properties (Forced Vibration): | | |
| Percent Relative Damping | 23.75 | 17.0 |
| Dyn. Mod., $k \times 10^{-7}$ | 2.79 | 2.10 |
| Viscosity, $\eta \times 10^{-4}$ | 4.76 | 2.47 |

Once again the improvement in stress-strain and especially in hysteretic properties is apparent both for mixtures with furnace black and with thermal black when Polyac is present during the heat treatment.

EXAMPLE 9

*Effect of other cross-linking agents*

A study was made of the improvements obtainable by the use of other cross-linking agents which exert effects similar to those of dinitroso benzene (Polyac). The mixtures were made up from isobutylene-isoprene copolymer and SRF (furnace) carbon black with the indicated materials added. Quinone dioxime (GMF) and dibenzoquinone dioxime were tested. Samples were also prepared for controls and for comparison with Polyac. The samples were heated under static conditions for 8 hours at 320° F. The details of the experiments are shown in Table 15. The samples were compounded with the indicated curatives and cured for 40 minutes at 307° F.

The data obtained by examination of the physical properties of the samples is shown in Table 16.

It can be seen from the data in Table 16 that other cross-linking agents, as well as dinitroso benzene, can be employed for getting the good results of this invention.

TABLE 15

| Sample No | 11 | 12 | 13 | 14 | 15 |
|---|---|---|---|---|---|
| Isobutylene-isoprene copolymer | 100 | 100 | 100 | 100 | [1] 100 |
| SRF Carbon Black | 50 | 50 | 50 | 50 | [1] 50 |
| Polyac (p-dinitroso benzene) | | 0.5 | | | |
| Quinone dioxime (GMF) | | | 0.5 | 0.5 | |
| Pb$_3$O$_4$ (oxidizing agent) | | | | 1.5 | [1] 1.5 |
| 2,2'-Benzothiazyl disulfide (as oxidizing agent) | | | 1.0 | | |
| Dibenzoquinone dioxime | | | | | [1] 1.5 |
| Zinc Oxide | 5 | 5 | 5 | 5 | [2] 5 |
| Tetramethylthiuram disulfide | 1.25 | 1.25 | 1.25 | 1.25 | [2] 1.25 |
| Sulfur | 2 | 2 | 2 | 2 | [2] 2 |

[1] Portions for thermal interaction.
[2] Portions for curing.

TABLE 16

| Sample No | 11 | 12 | 13 | 14 | 15 |
|---|---|---|---|---|---|
| Modulus @— | | | | | |
| 100% Elong | 280 | 280 | 430 | 210 | 210 |
| 200% Elong | 670 | 930 | 1,450 | 725 | 525 |
| 300% Elong | 1,100 | 1,700 | | 1,465 | 1,050 |
| 400% Elong | 1,465 | 2,275 | | | 1,580 |
| 500% Elong | 1,765 | | | | 2,000 |
| Tensile Strength | 1,930 | 2,350 | 2,235 | 2,020 | 2,100 |
| Elongation | 530 | 410 | 290 | 395 | 530 |
| Percent Relative Damping | 26.2 | 22.4 | 20.4 | 19.3 | 18.8 |
| Dyn. Mod. (dynes×10$^{-7}$) | 2.98 | 2.45 | 2.84 | 2.74 | 2.42 |
| Viscosity (poises×10$^{-4}$) | 5.68 | 3.91 | 4.08 | 3.70 | 3.18 |

EXAMPLE 10

*Banbury heat treatment with and without Polyac*

A series of 4 comparative experiments was carried out to study the relative effects of heat treating isobutylene-isoprene copolymer and carbon black mixtures with and without Polyac being present during the heating. These experiments and the results obtained are tabulated in Table 17. The stress-strain data of the 4 masterbatch samples are plotted in Figure XII and the 300% modulus, damping and electrical resistivity data are shown in Figure XIII.

The 4 masterbatches were prepared on the basis of 1800 grams of isobutylene-isoprene copolymer and 900 grams of channel black. When indicated, 9.0 grams of Polyac were used. The thus mixed masterbatches were then treated as follows:

Masterbatch 1—8 minute control, cold mill mix.
Masterbatch 2—8 minute cold mill mix—followed by 30 minute hot Banbury mix (360° F.—discharge temperature).
Masterbatch 3—8 minute cold mill mix—no further treatment prior to addition of the curatives and subsequent vulcanization.
Masterbatch 4—8 minute cold mill mix—followed by 30 minute hot Banbury mix (380° F. discharge temperature).

The curing formulation was as follows:

| | Parts by weight |
|---|---|
| Copolymer | 100 |
| MPC carbon black | 50 |
| Zinc oxide | 5 |
| Tetramethylthiuram disulfide | 1.25 |
| Sulfur | 2 |
| Polyac[1] | 0.5 |

[1] Polyac was used as a curative in masterbatch Samples 3 and 4 only.

Vulcanization of the samples was carried out for 40 minutes at 307° F.

These comparative studies give a clear indication of the relative efficacy of thermal treatment with and without Polyac being present. The properties of the vulcanizate prepared from masterbatch No. 3 are somewhat better than those of the vulcanizate from masterbatch No. 2. By far the most effective use of Polyac is obtained by employing it together with the thermal treatment before the addition of curatives and subsequent vulcanization. Considering the samples in the following order: (1) control; (2) thermal pretreatment without Polyac; (3) Polyac without thermal pretreatment; and (4) thermal pretreatment with Polyac; there is a regular increasing of the modulus value. For example, 300% elongation, the respective values are 1000 lbs., 1250 lbs., 1340 lbs., and 1650 lbs.

The electrical resistivity data are also very informative. It has been previously established that electrical measurements of this type are of value in the study of carbon-polymer association. It is now known that resistivity increases as carbon pigment particles become more finely divided and more strongly associated with the polymer. It is apparent from the data that the more drastic the thermal treating operation the higher the resistivity of the resulting compositions. Thus, the highest resistivity in this series of samples was obtained with the Polyac-thermally pretreated masterbatch.

The most significant data, however, are the dynamic properties of the vulcanizates. These properties were determined for the present series of compounds both by use of the Yerzley oscillograph, which measures the internal viscosity effects under conditions of free vibration and by the method for measuring dynamic properties under constant load-constant deformation conditions. Both methods of measurement reveal remarkable improvements in the dynamic properties of these compositions. The Polyac heat pretreated compound shows particularly outstanding damping properties when tested by both methods,

TABLE 17.—POLYAC REACTIONS IN LABORATORY BANBURY

| Masterbatch | 16 Control | 17 Thermal treatment, No Polyac | 18 Polyac, No thermal treat | 19 Polyac, Thermal treatment |
|---|---|---|---|---|
| Stress-Strain Properties: | | | | |
| Mod. @— | | | | |
| 100% Elongation | 250 | 225 | 270 | 260 |
| 200% Elongation | 540 | 640 | 700 | 800 |
| 300% Elongation | 1,000 | 1,250 | 1,340 | 1,650 |
| 400% Elongation | 1,550 | 1,970 | 2,050 | 2,480 |
| 500% Elongation | 2,240 | 2,680 | 2,700 | 3,120 |
| 600% Elongation | 2,900 | 3,240 | | |
| Tensile Strength | 3,425 | 3,415 | 3,220 | 3,205 |
| Elongation | 690 | 620 | 595 | 510 |
| Electrical Resistivity: | | | | |
| Ohm Centimeters | $1.6 \times 10^5$ | $1.9 \times 10^{12}$ | $1.6 \times 10^{12}$ | $10^{13}$ |
| Dynamic Properties: | | | | |
| a. Yerzley Method @ 50° C. ($\eta f \times 10^{-6}$) | 4.11 | 2.90 | 2.51 | 1.91 |
| b. Constant load—constant deformation— | | | | |
| Percent R. D. | 30.2 | 28.5 | 26.8 | 21.1 |
| +90° C. Dyn. Mod.$\times 10^7$ | 4.06 | 3.33 | 2.5 | 2.69 |
| $\eta \times 10^4$ | 9.15 | 7.0 | 4.9 | 4.02 |
| Percent R. D. | 39.0 | 35.3 | 33.7 | 28.5 |
| +50° C. Dyn. Mod.$\times 10^7$ | 4.01 | 3.77 | 3.51 | 2.84 |
| $\eta \times 10^4$ | 12.3 | 10.22 | 9.01 | 5.97 |
| Percent R. D. | 54.25 | 57.3 | 56.5 | 58.0 |
| +10° C. Dyn. Mod.$\times 10^7$ | 7.1 | 6.42 | 5.72 | 4.71 |
| $\eta \times 10^4$ | 33.45 | 32.5 | 28.15 | 24.4 |

EXAMPLE 11

*Effect of heat treatment with Polyac on GR-S and natural rubber*

For comparative purposes samples of isobutylene-isoprene copolymer (97% isobutylene-3% isoprene copolymer), GR-S synthetic rubber (75% butadiene-25% styrene copolymer) and smoked sheet natural rubber were made up into separate mixtures, each containing 100 parts of polymer, 50 parts of MPC (channel) carbon black, 0.5 part of stearic acid, and 0.5 part of Polyac. Except for the isobutylene-isoprene copolymer, 1 part of phenyl-beta-naphthylamine was included as a stabilizer.

All mixtures were prepared in a OO Banbury mixer under cool conditions (maximum 230° F.). A sample of each was taken as a control. The remainder of each mixture was returned to the Banbury mixer and was heat treated for 30 minutes. During the first 15 minutes, the temperature rose to 160° C. and up to 200° C. at the end of the treatment. To both the control samples and the heat treated portions there were added zinc oxide, accelerators, and sulfur, as shown in Table 18.

TABLE 18

| | Isobutylene Isoprene Copolymer | GR-S | Natural Rubber |
|---|---|---|---|
| | Parts by weight | | |
| Masterbatch | 151 | 152 | 152 |
| Stearic Acid | | 0.5 | 2.5 |
| Zinc Oxide | 5 | 5 | 3 |
| Sulfur | 2 | 1.75 | 3 |
| Tetramethylthiuram disulfide | 1.25 | | |
| 2,2'-Benzothiazyl disulfide | | 1.5 | |
| Mercaptobenzothiazole | | | 1 |
| Cure Conditions: | | | |
| Temperature, ° F | 307 | 307 | 307 |
| Time, Min | 45 | 25 | 25 |

All the samples were then tested as heretofore described. The pertinent data obtained are shown in Table 19. These data show that the maximum tensile strength of the isobutylene-isoprene copolymer is substantially unaltered in this experiment by heat treatment with Polyac and carbon black, but the tensile strengths of the GR-S and natural rubber are radically reduced by the identical treatment.

Also, it can be noted, that the tear strength of the isobutylene-isoprene copolymer is much less affected than are those of GR-S and natural rubber.

The tear strength of the samples after ageing is particularly significant. For example, the final tear strength of the heat treated isobutylene-isoprene copolymer is over 50% of the control before ageing, while the GR-S has retained only 32% of its tear strength after ageing.

TABLE 19

| Series | Isobutylene-Isoprene Copolymer | | GR-S | | Natural Rubber | |
|---|---|---|---|---|---|---|
| | A[1] | B[2] | A[1] | B[2] | A[1] | B[2] |
| Tensile Strength | 3,350 | 3,200 | 3,060 | 2,425 | 4,075 | 2,400 |
| Percent Loss in Tensile | | 4.25 | | 20.8 | | 49.5 |
| Tear Strength, #/in | 430 | 300 | 295 | 145 | 550 | 85 |
| Percent Loss in Tear | | 30 | | 50.8 | | 84.6 |
| Tear Strength after ageing (1 wk./100° C.) | 245 | 220 | 170 | 90 | 80 | 65 |

[1] A—Control.
[2] B—Heat treated samples.

EXAMPLE 12

*Effect of variations in Polyac concentration*

Comparative experiments were carried out in order to determine the effects of varying the concentration of Polyac (p-dinitroso benzene) used in the heat treatment. The portions indicated in Tables 20 and 21 were subjected to a static heat treatment in open steam for 5 hours at 320° F. The indicated additional materials were then added for curing and the samples were cured for 45 minutes at 307° F.

The vulcanized samples were tested in the same manner as the samples of the previously described experiments and the results are shown in Table 21. Percentages of Polyac ranging from 0.10 up to 0.75 in the samples treated gave vulcanizates having quite satisfactory properties and they showed, in every instance, damping values much lower than that of the control. A maximum decrease in damping was obtained using about 0.5% Polyac, although this optimum percentage may vary slightly depending on polymer type, carbon black type and concentration, as well as conditions of thermal pretreatment and cure.

TABLE 20

Portions for thermal interaction: Parts by weight
- Isobutylene-isoprene copolymer _____ 100.0
- SRF carbon black _____ 50.0
- Stearic acid _____ 0.25
- Polyac _____ As indicated in Table 21

Portions for curing:
- Zinc oxide _____ 5.0
- Sulfur _____ 2.0
- Tetramethylthiuram disulfide _____ 1.25

TABLE 21

| Sample No. | 20 | 21 | 22 | 23 | 24 | 25 | 26 | 27 |
|---|---|---|---|---|---|---|---|---|
| Parts of Polyac/100 Parts of Polymer | None, Control | 0.05 | 0.10 | 0.15 | 0.20 | 0.30 | 0.50 | 0.75 |
| Mod. @ #/in$^2$: | | | | | | | | |
| 100% Elong | 290 | 310 | 340 | 350 | 365 | 400 | 400 | 490 |
| 200% Elong | 740 | 870 | 975 | 1,020 | 1,100 | 1,230 | 1,250 | 1,520 |
| 300% Elong | 1,175 | 1,400 | 1,620 | 1,700 | 1,800 | 2,000 | 2,050 | |
| 400% Elong | 1,575 | 1,800 | | | | | | |
| Tensile Strength, #/in.$^2$ | 1,660 | 1,890 | 1,950 | 2,000 | 2,000 | 2,250 | 2,250 | 2,300 |
| Percent Elongation | 425 | 400 | 375 | 370 | 355 | 345 | 330 | 295 |
| Damping, $\eta f \times 10^{-6}$, poises $\times$ c. p. s. | 1.68 | | 1.38 | 1.27 | 1.27 | 1.25 | 1.21 | 1.24 |

What is claimed is:

1. A process which comprises mixing carbon black with a low unsaturation solid olefin-multiolefin synthetic rubbery copolymer and from 0.3% to about 0.5% of a reactant selected from the group consisting of dinitroso compounds, dioximes, and aromatic quinonoid compounds, and subjecting said mixture to an elevated temperature for an extended period of time, the combination of said temperature and said time being substantially as severe as the combination of a temperature of 360° F. for a time of 30 minutes whereby both the stress properties and the elastic properties of the subsequently cured copolymer are improved, and the Mooney value is on the decrease from the maximum.

2. A composition of matter made by the process of claim 1 comprising a solid copolymer of an olefin having from 4 to 14 carbon atoms and a multiolefin having from 4 to 14 carbon atoms, having an iodine number less than 50, said copolymer combined with carbon black forming a composition containing non-reversibly "bound" copolymer with 0.3 to about 0.5% of a reactant selected from the group consisting of dinitroso compounds, dioximes, and aromatic quinonoid compounds, said composition capable of vulcanization.

3. A vulcanized composition of matter comprising a low unsaturation solid copolymer of an olefin having from 4 to 14 carbon atoms and a multiolefin having from 4 to 14 carbon atoms, having an iodine number less than 50, irreversibly heat interacted by the process of claim 1 with carbon black through the agency of p-dinitroso benzene, but without undergoing vulcanization, and subsequently vulcanized in the presence of an added vulcanizing amount of at least one sulfur curing agent.

4. A vulcanized composition of matter comprising a low unsaturation copolymer of an olefin having from 4 to 14 carbon atoms and a multiolefin having from 4 to 14 carbon atoms, having an iodine number less than 50, irreversibly heat interacted by the process of claim 1 with carbon black through the agency of p-dinitroso benzene, but without undergoing vulcanization, and subsequently vulcanized in the presence of an added vulcanizing amount of at least one non-sulfur curing agent.

5. A vulcanized composition of matter comprising a low unsaturation copolymer of isobutylene and a diolefin having from 4 to 8 carbon atoms, having an iodine number less than 50, irreversibly heat interacted by the process of claim 1 with 20 to 200 parts of carbon black per 100 of copolymer through the agency of 0.3 to about 0.5 parts of p-dinitroso benzene, but without undergoing vulcanization, and subsequently vulcanized in the presence of an added vulcanizing amount of at least one sulfur curing agent.

6. A composition according to that described in claim 5 in which the diolefin is butadiene.

7. A process which comprises mixing carbon black with a solid, rubbery copolymer of isobutylene and a conjugated diolefin having from 4 to 8 carbon atoms, and from 0.3% to about 0.5% of an aromatic dinitroso compound reactant, the copolymer having an iodine number below 50, and subjecting said mixture to a temperature above 250° F. but below the decomposition temperature of the copolymer, for an extended period of time, at least equivalent to the combination of 360° F. for 30 minutes, whereby the stress-strain and elasticity properties of the copolymer after cure are improved, and the Mooney value is on the decrease from the maximum.

8. A process according to that described in claim 7 in which from 20 to 200 parts of carbon black per 100 parts of copolymer are employed and the reactant is a quinone dioxime.

9. A process which comprises preparing a mixture of 20 to 200 parts of carbon black, 100 parts of a low unsaturation isobutylene-isoprene rubbery copolymer, and about 0.3% to about 0.5% of p-dinitroso benzene based on the amount of copolymer, subjecting said mixture to a temperature between 250° F. and 450° F. for an extended period of time ranging from about 15 minutes to several hours depending on temperature and heating conditions, at least equivalent in severity to the combination of 360° F. for 30 minutes, whereby the stress-strain and elasticity properties of the copolymer after subsequent cure are improved.

10. A process according to that described in claim 9 in which the heating at elevated temperature is accompanied by mechanical agitation.

11. A process which comprises preparing a mixture of carbon black, a low unsaturation isobutylene-butadiene rubbery copolymer and about 0.3% to about 0.5% of p-dinitroso benzene based on the amount of copolymer, subjecting said mixture to a temperature between 250° F. and 450° F. for an extended period of time ranging from about 15 minutes to several hours depending on temperature and heating conditions, at least equivalent in severity to the combination of 360° F. for 30 minutes, whereby the stress-strain and elasticity properties of the copolymer after subsequent cure are improved.

12. A process for producing a solid, vulcanized copolymer composition which comprises subjecting a mixture of a low unsaturation, solid, rubbery copolymer of an isoolefin having from 4 to 14 carbon atoms and a diolefin having from 4 to 14 carbon atoms, carbon black, and 0.3 to about 0.5% of a reactant selected from the group consisting of dinitroso compounds, dioxime, and aromatic quinonoid compounds, to a temperature between about 250° F. and 450° F. for a period of time exceeding 5 minutes, at least equivalent to the combination of 360° F. for 30 minutes, in the absence of agents capable of effecting substantial vulcanization, thereafter adding at least one vulcanizing agent with mixing and effecting vulcanization.

13. A process for producing cured isobutylene-diolefin, synthetic rubbers having improved stress-strain and elasticity properties and especially suitable for tire and tread stocks, which comprises subjecting a mixture of from 20 to 200 parts by weight of carbon black, 100 parts by weight of a low unsaturation solid, vulcanizable copolymer of isobutylene and a conjugated diolefin of 4 to 8 carbon atoms, said copolymer having an iodine number below 50, and about 0.5% of p-dinitroso benzene based on the amount of copolymer, to an elevated temperature above 250° F. but below about 450° F., for a period of time ranging from about 15 minutes to several hours depending on the temperature employed, at least equivalent in severity to the combination of 360° F. for 30 minutes in the absence of agents in an amount sufficient to effect substantial vulcanization, and thereafter adding at least one vulcanizing agent, mixing, shaping, and effecting vulcanization.

14. A process for fabricating vulcanized rubbery copolymers of improved stress-strain and elasticity properties, suitable for tire and tread stocks, which comprises admixing a vulcanizing agent with a low unsaturation isoolefin-diolefin copolymer containing 20 to 200 parts of carbon black per 100 parts of the original copolymer, and containing about 0.5% of a heat interacted aromatic dinitroso compound combined with the copolymers and carbon black, to give non-reversibly bound copolymer, said interacted composition having been made by interaction at a temperature and time at least equivalent to the combination of 360° F. for 30 minutes, and subjecting the mixture to forming operations and vulcanizing by heat and curing agents.

15. A process for converting rubbery, synthetic copolymers into vulcanizable, copolymer compositions of improved characteristics, which comprises subjecting a mixture of 100 parts by weight of a low unsaturation rubbery copolymer of isobutylene and isoprene, 20 to 200 parts of carbon black, and about 0.3 to 0.5 part of a reactant selected from the group consisting of dinitroso compounds, dioximes, and aromatic quinonoid compounds, to a temperature of 250 to 450° F. for a time between 5 minutes and 8 hours, using a temperature-time relationship substantially equivalent to those shown in the following table:

| Temperature (° F.): | Time (minutes) |
| --- | --- |
| 450 | 5 |
| 400–420 | 30–40 |
| 360–380 | 30–60 |
| 320 | 60 |
| 275 | 120 |
| 250 | 420–480 | in the absence of agents effecting substantial vulcanization.

16. A process for converting rubbery, synthetic copolymers into vulcanizable copolymer compositions of improved characteristics, which comprises subjecting a mixture of 100 parts by weight of a rubbery copolymer of 95–99.5% of isobutylene and 5–0.5% of isoprene, said copolymer having an average Staudinger molecular weight of 20,000 to 200,000 and a Wijs iodine number of 1 to 50, about 50 parts of carbon black and about 0.3–0.5% of p-dinitroso benzene, to a temperature of at least 360° F. for a time of at least 30 minutes, in the absence of agents effecting substantial vulcanization, whereby the stress-strain and elasticity properties of the copolymer after cure are improved.

17. Process according to claim 16, in which the heat interaction is carried out with a temperature-time relationship substantially equivalent to the ranges shown in the following table:

| Temperature (° F.): | Time (minutes) |
| --- | --- |
| 450 | 5–15 |
| 400–420 | 30–40 |
| 360–380 | 30–60 |

18. A vulcanized composition of matter comprising 100 parts by weight of a rubbery copolymer of 95–99.5% of isobutylene and 5–0.5% of isoprene, said copolymer having an average Staudinger molecular weight of 20,000–200,000 and a Wijs iodine number of 1 to 50, irreversibly heat interacted by the process of claim 16 with about 50 parts of carbon black, through the agency of about 0.3 to 0.5 part of p-dinitrosobenzene, but without undergoing vulcanization and subsequently vulcanized in the presence of about 2 parts of added sulfur and in the presence of an added vulcanizing amount of about 1 to 2 parts of a sulfur curing agent.

19. The method which comprises masticating in a Banbury mixer a uniform mixture of 100 parts of an isobutylene-multi-olefinic unsaturate rubbery copolymer, at least 35 parts of rubber-reinforcing carbon black selected from the group consisting of channel black and oil furnace black, and paraquinone-dioxime, in an amount insufficient to cure the rubbery copolymer, at a temperature of at least 300° F. for at least 10 minutes but not over 30 minutes, an extraneous oxidizing agent capable of activating said para-quinone-dioxime being present in the mixture subjected to mastication when said carbon black is oil furnace black, cooling the mixture, incorporating vulcanizing ingredients therewith, shaping the mixture, and vulcanizing the shaped mixture.

20. The methods which comprises masticating in a Banbury mixer a uniform mixture of 100 parts of an isobutylene multi-olefinic unsaturate rubbery copolymer, at least 35 parts of rubber-reinforcing carbon black selected from the group consisting of channel black and oil furnace black, and about 0.3 part of para-dinitroso-benzene at a temperature of at least 300° F. for at least 10 minutes but not over 30 minutes, cooling the mixture, incorporating vulcanizing ingredients therewith, shaping the mixture, and vulcanizing the shaped mixture.

References Cited in the file of this patent

UNITED STATES PATENTS

| 2,393,321 | Haworth | Jan. 22, 1946 |
| 2,494,766 | Lightbown et al. | Jan. 17, 1950 |
| 2,526,504 | Rehner et al. | Oct. 17, 1950 |
| 2,548,505 | Turner | Apr. 10, 1951 |
| 2,557,641 | Dudley | June 19, 1951 |